US012558840B2

(12) United States Patent
Yu et al.

(10) Patent No.: US 12,558,840 B2
(45) Date of Patent: Feb. 24, 2026

(54) DEVICES, SYSTEMS, AND METHODS FOR THREE-DIMENSIONAL PRINTING OF CONTINUOUS FIBER-REINFORCED THERMOSET COMPOSITES

(71) Applicant: The Regents of the University of Colorado, Denver, CO (US)

(72) Inventors: Kai Yu, Denver, CO (US); Xu He, Littleton, CO (US); Martin Dunn, Denver, CO (US); Arif Abdullah, Denver, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 491 days.

(21) Appl. No.: 17/900,856

(22) Filed: Aug. 31, 2022

(65) Prior Publication Data

US 2023/0064628 A1     Mar. 2, 2023

Related U.S. Application Data

(60) Provisional application No. 63/239,091, filed on Aug. 31, 2021.

(51) Int. Cl.
*B29C 64/209* (2017.01)
*B29C 64/165* (2017.01)
(Continued)

(52) U.S. Cl.
CPC .......... *B29C 64/209* (2017.08); *B29C 64/165* (2017.08); *B29C 64/227* (2017.08);
(Continued)

(58) Field of Classification Search
CPC ... B29C 64/209; B29C 64/165; B29C 64/227; B29C 64/264; B29C 64/33
See application file for complete search history.

(56) References Cited

U.S. PATENT DOCUMENTS 9,511,543 B2   12/2016   Tyler
9,987,798 B2    6/2018   Tyler
(Continued)

OTHER PUBLICATIONS

B. Berman, 3-D printing: the new industrial revolution, Bus. Horiz. 55 (2) (2012) 155-162.
(Continued)

*Primary Examiner* — Michael M. Robinson
(74) *Attorney, Agent, or Firm* — Meunier Carlin & Curfman LLC

(57) ABSTRACT

A printer head for three-dimensional printing of a continuous fiber-reinforced thermoset composite may include a deposition syringe, a fiber housing, and a feeding tube. The deposition syringe may define a resin reservoir, an air chamber, and a first inlet port configured to deliver a first flow of air to the air chamber. The deposition syringe may include a syringe body and a piston. The syringe body may include an inlet section, a needle section, and a converging section disposed between the inlet section and the needle section. The fiber housing may define a fiber chamber and a second inlet port configured to deliver a second flow of air to the fiber chamber. The feeding tube may extend from the fiber chamber to the needle section and may be configured to receive the second flow of air therein and to guide a fiber from the fiber chamber to the needle section.

9 Claims, 10 Drawing Sheets

(51) Int. Cl.

| | |
|---|---|
| *B29C 64/227* | (2017.01) |
| *B29C 64/264* | (2017.01) |
| *B29C 64/336* | (2017.01) |
| *B29K 307/04* | (2006.01) |
| *B29K 309/08* | (2006.01) |
| *B33Y 10/00* | (2015.01) |
| *B33Y 30/00* | (2015.01) |
| *B33Y 70/10* | (2020.01) |

(52) U.S. Cl.
CPC .......... *B29C 64/264* (2017.08); *B29C 64/336* (2017.08); *B29K 2307/04* (2013.01); *B29K 2309/08* (2013.01); *B33Y 10/00* (2014.12); *B33Y 30/00* (2014.12); *B33Y 70/10* (2020.01)

(56) References Cited

U.S. PATENT DOCUMENTS

| | | | | |
|---|---|---|---|---|
| 10,173,410 B2 | 1/2019 | Nardiello et al. | | |
| 10,920,002 B2 | 2/2021 | Moore et al. | | |
| 2017/0015060 A1* | 1/2017 | Lewicki | ................ | B29C 64/209 |
| 2021/0387408 A1* | 12/2021 | Tian | ...................... | B29C 64/118 |
| 2022/0184890 A1* | 6/2022 | Herren | .................. | B29C 64/209 |

OTHER PUBLICATIONS

T.D. Ngo et al., Additive manufacturing (3D printing): a review of materials, methods, applications and challenges, Compos. Part B Eng. 143 (2018) 172-196.

M. Gebler, et al., A global sustainability perspective on 3D printing technologies, Energy Policy 74 (2014) 158-167.

X. Wang, et al., 3D printing of polymer matrix composites: a review and prospective, Compos. Part B Eng. 110 (2017) 442-458.

P. Parandoush, et al., A review on additive manufacturing of polymer-fiber composites, Compos. Struct. 182 (15) (2017) 36-53.

B.G. Compton, et al., 3D-printing of lightweight cellular composites, Adv. Mater. 26 (34) (2014), 5930-5935.

Q. Ge, et al., Active materials by four-dimension printing, Appl. Phys. Lett. 103 (2013), 131901.

A.S. Gladman, et al., Biomimetic 4D printing, Nat. Mater. 15 (4) (2016), 413-418.

B. Bhushan, et al., An overview of additive manufacturing (3D printing) for microfabrication, Microsyst. Technol. Micro Nanosyst. Inf. Storage Process. Syst. 23 (4) (2017) 1117-1124.

M. Mao, et al., The emerging frontiers and applications of high-resolution 3D printing, Micromachines 8 (4) (2017) 113) show great promise in fabricating continuous-fiber reinforced composites.

Matsuzaki, M. Ueda, M. Namiki, T.K. Jeong, H. Asahara, K. Horiguchi, T. Nakamura, A. Todoroki, Y. Hirano, Three-dimensional printing of continuous-fiber composites by in-nozzle impregnation, Sci. Rep. 6 (2016) 23058.

J.A. Lewis, et al., Direct writing in three dimensions, Mater. Today 7 (7-8) (2004) 32-39.

A. Lewis, Direct ink writing of 3D functional materials, Adv. Funct. Mater. 16 (17) (2006) 2193-2204.

G.M. Gratson, et al., Microperiodic structures: direct writing of three-dimensional webs, Nature 428 (6981) (2004) (p. 386-386).

C.P. Ambulo, et al., Four-dimensional printing of liquid crystal elastomers, ACS Appl. Mater. Interfaces 9 (42) (2017) 37332-37339.

A. Kotikian, et al., 3D printing of liquid crystal elastomeric actuators with spatially programed nematic order, Adv. Mater. 30 (10) (2018) 17061641-17061646.

J.A. Lewis, Novel inks for direct writing in three dimensions, Digital Fabrication 2005, Final Program and Proceedings, (2005): p. 142-142.

I.D. Robertson, et al., Rapid energy-efficient manufacturing of polymers and composites via frontal polymerization, Nature 557 (7704) (2018) 223-227.

S. Mazumdar, Opportunities for thermoset resins in the composites industry, Thermoset Resin Formulators Association ; 2008 Annual Meeting Technical Papers; Sep. 14, 2008 (Abstract).

R. Zou, et al., Isotropic and anisotropic elasticity and yielding of 3D printed material, Compos. Part B Eng. 99 (2016) 506-513.

S.H. Ahn, et al., Anisotropic material properties of fused deposition modeling ABS, Rapid Prototyp. J. 8 (4) (2002) 248-257.

Q. Sun, et al., Effect of processing conditions on the bonding quality of FDM polymer filaments, Rapid Prototyp. J. 14 (2) (2008) 72-80.

M. Namiki, et al., 3D printing of continuous fiber reinforced plastic, Proc. Soc. Adv. Mater. Process. Eng. (2014).

J. Wang, et al., A novel approach to improve mechanical properties of parts fabricated by fused deposition modeling, Mater. Des. 105 (2016) 152-159.

H.L. Tekinalp, et al., Highly oriented carbon fiber-polymer composites via additive manufacturing, Compos. Sci. Technol. 105 (2014) 144-150.

F.V.D. Klift, et al., 3D printing of continuous carbon fibre reinforced thermo-plastic (CFRTP) tensile test specimens, Open J. Compos. Mater. 6 (1) (2015) 18-27.

H.J. Vaneker, Material extrusion of continuous fiber reinforced plastics using commingled yarn, 1st Cirp Conference on Composite Materials Parts Manufacturing (Cirp Ccmpm 2017), (2017) 66: p. 317-322.

He, Xu, et al. "3D printing of continuous fiber-reinforced thermoset composites." Additive Manufacturing 40 (Apr. 2021): 101921. doi:10.1016/j.addma.2021.101921.

Taynton et al. (Heat- or water-driven malleability in a highly recyclable covalent network polymer, Adv. Mater. 26 (23) (2014) 3938-3942.

K. Yu, et al., Carbon fiber reinforced thermoset composite with near 100% recyclability, Adv. Funct. Mater. 26 (33) (2016) 6098-6106.

X. Shi, et al., Primary recycling of anhydride-cured engineering epoxy using alcohol solvent, Polym. Eng. Sci. 59 (S2) (2018) E111-E119.

X. He, et al., Recyclable 3D printing of polyimine-based covalent adaptable network polymers, 3D Print. Addit. Manuf. 6 (1) (2019) 31-39.

X. Shi, et al., A multiscale chemomechanics theory for the solvent—assisted recycling of covalent adaptable network polymers, J. Mech. Phys. Solids 138 (2020), 103918.

K. Yu, et al., Dissolution of covalent adaptable network polymers in organic solvent, J. Mech. Phys. Solids 109 (2017) 78-94.

C.N. Bowman, et al., Covalent adaptable networks: reversible bond structures incorporated in polymer networks, Angew. Chem. Int. Ed. 51 (18) (2012) 4272-4274.

C.J. Kloxin, et al., Covalent adaptable networks (CANS): a unique paradigm in cross-linked polymers, Macromolecules 43 (6) (2010) 2643-2653.

X. He, et al., Cyclic welding behavior of covalent adaptable network polymers, J. Polym. Sci. Part B Polym. Phys. 56 (5) (2018) 402-413.

K. Yu, et al., Reprocessing and recycling of thermosetting polymers based on bond exchange reactions, RSC Adv. 4 (20) (2014) 10108-10117.

C. Luo, et al., Chemomechanics in the moisture-induced malleability of polyimine-based covalent adaptable networks, Macromolecules 51 (23) (2018) 9825-9838.

C. Luo, et al., Effects of bond exchange reactions and relaxation of polymer chains on the thermomechanical behaviors of covalent adaptable network polymers, Polymer 153 (2018) 43-51.

C. Luo, et al., Chemomechanics of dual-stage reprocessable thermosets, J. Mech. Phys. Solids 126 (2019) 168-186.

K.-i Mori, et al., Dieless forming of carbon fibre reinforced plastic parts using 3D printer, Procedia Eng. 81 (2014) 1595-1600.

N. Li, et al., Rapid prototyping of continuous carbon fiber reinforced polylactic acid composites by 3D printing, J. Mater. Process. Technol. 238 (2016) 218-225.

C. Yang, et al., 3D printing for continuous fiber reinforced thermoplastic composites: mechanism and performance, Rapid Prototyp. J. 23 (2017) 209-215.

X. Tian, et al., Interface and performance of 3D printed continuous carbon fiber reinforced PLA composites, Compos. Part A Appl. Sci. Manuf. 88 (2016) 198-205.

(56) References Cited

OTHER PUBLICATIONS

X. Tian, et al., Recycling and remanufacturing of 3D printed continuous carbon fiber reinforced PLA composites, J. Clean. Prod. 142 (2017) 1609-1618.

G.D. Goh, et al., Characterization of mechanical properties and fracture mode of additively manufactured carbon fiber and glass fiber reinforced thermoplastics, Mater. Des. 137 (2018) 79-89.

D. Jiang, et al., Mechanical behavior of carbon fiber composites produced with fused filament fabrication, in Solid Freeform Fabrication Symposium Proceedings, (2016).

L.J. Love, et al., The importance of carbon fiber to polymer additive manufacturing, J. Mater. Res. 29 (17) (2014) 1893-1898.

G. Liao, et al., Properties of oriented carbon fiber/polyamide 12 composite parts fabricated by fused deposition modeling, Mater. Des. 139 (2018) 283-292.

W. Zhang, et al., Interfacial bonding strength of short carbon fiber/acrylonitrile-butadiene-styrene composites fabricated by fused deposition modeling, Compos. Part B Eng. 137 (2018) 51-59.

N. Nawafleh, et al., Additive manufacturing of short fiber reinforced thermoset composites with unprecedented mechanical performance, Addit. Manuf. 33 (2020), 101109.

M. Invernizzi, et al., UV-assisted 3D printing of glass and carbon fiber-reinforced dual-cure polymer composites, Materials 9 (7) (2016) 583.

P. Taynton, et al. (2014); P. Taynton, et al., Repairable woven carbon fiber composites with full recyclability enabled by malleable polyimine networks, Adv. Mater. 28 (15) (2016) 2904-2909.

* cited by examiner

100

$V_{FIBER}=5\%$    9%    18%    36%

DEVICES, SYSTEMS, AND METHODS FOR THREE-DIMENSIONAL PRINTING OF CONTINUOUS FIBER-REINFORCED THERMOSET COMPOSITES

CROSS-REFERENCE TO RELATED APPLICATIONS

This application claims the benefit of, and priority to, U.S. Provisional Patent Application No. 63,239,091, filed on Aug. 31, 2021, and titled "Devices, Systems, and Methods for Three-Dimensional Printing of Continuous Fiber-Reinforced Thermoset Composites," the disclosure of which is expressly incorporated herein by reference in its entirety.

GOVERNMENT SUPPORT CLAUSE

This invention was made with government support under Grant No. CMMI-1901807 awarded by the National Science Foundation and Grant No. FA9550-20-1-0306 awarded by the Air Force Office of Scientific Research. The government has certain rights in the invention.

FIELD OF THE DISCLOSURE

The present disclosure relates generally to three-dimensional printing and more particularly to devices, systems, and methods for three-dimensional printing of continuous fiber-reinforced thermoset composites.

BACKGROUND OF THE DISCLOSURE

Continuous fiber-reinforced thermoset composites, with their superior combination of stiffness, strength, and lightweight attributes, have been leading contenders in various applications ranging from aerospace to ground transportation. See D. Chung, *Carbon Composites,* Elsevier Inc, New York City, NY, USA, 2016; P. Morgan, *Carbon Fibers and Their Composites,* CRC Press, Taylor & Francis Group, Boca Raton, FL, USA, 2005. Conventional manufacturing methods, such as injection molding, filament winding, and pultrusion, generally use expensive molding tools to shape the resin and fibers. See A. B. Strong, *Fundamentals of composites manufacturing: materials, methods and applications,* Soc. Manuf. Eng. (2007). Accordingly, mass production may be required to even out the overhead cost of tooling, labor for assembly, and production. The economic barrier to creating complex structures or changing the design of composite products typically may be significant. In great contrast, three-dimensional (3D) printing enables the moldless fabrication of composite parts with no additional cost for geometric complexity. The high design freedom and low cost-per-part generally make 3D printing ideal for rapid prototyping and product development. See B. Berman, *3-D printing: the new industrial revolution,* Bus. Horiz. 55 (2) (2012) 155-162; T. D. Ngo et al., *Additive manufacturing (3D printing): a review of materials, methods, applications and challenges,* Compos. Part B Eng. 143 (2018) 172-196; M. Gebler, et al., *A global sustainability perspective on 3D printing technologies,* Energy Policy 74 (2014) 158-167; X. Wang, et al., *3D printing of polymer matrix composites: a review and prospective,* Compos. Part B Eng. 110 (2017) 442-458; P. Parandoush, et al., *A review on additive manufacturing of polymer-fiber composites,* Compos. Struct. 182 (15) (2017) 36-53. In addition, 3D printing may allow the user to easily design composites with tailored fiber distribution and selective reinforcements. See B. G. Compton, et al., *3D-printing of lightweight cellular composites,* Adv. Mater. 26 (34) (2014), 5930+; Q. Ge, et al., *Active materials by four-dimension printing,* Appl. Phys. Lett. 103 (2013), 131901; A. S. Gladman, et al., *Biomimetic 4D printing,* Nat. Mater. 15 (4) (2016), 413+.

Among a variety of polymer 3D printing techniques, the extrusion-based printing methods (see T. D. Ngo, et al.; B. Bhushan, et al., *An overview of additive manufacturing (3D printing) for microfabrication,* Microsyst. Technol. Micro Nanosyst. Inf. Storage Process. Syst. 23 (4) (2017) 1117-1124; M. Mao, et al., *The emerging frontiers and applications of high-resolution 3D printing,* Micromachines 8 (4) (2017) 113) show great promise in fabricating continuous-fiber reinforced composites. For example, Matsuzaki et al. (*Three-dimensional printing of continuous-fiber composites by in-nozzle impregnation,* Sci. Rep. 6 (2016) 23058) customized a fused deposition modeling (FDM) printer to fabricate composites using in-nozzle impregnation. The polylactic acid (PLA) filament and continuous fibers were separately supplied to the printer head. Various composite filaments and printers (e.g., Markforged, Watertown, MA) have been commercialized to print composites with a predetermined resin-fiber combination. However, the FDM-based methods are limited to the printing of thermoplastics composites, which do not typically possess the stiffness and strength for high-performance applications.

The direct ink writing (DIW) technique allows for the printing of a wide range of thermosetting polymers. See B. G. Compton, et al.; A. S. Gladman, et al.; J. A. Lewis, *Direct ink writing of 3D functional materials,* Adv. Funct. Mater. 16 (17) (2006) 2193-2204; J. A. Lewis, et al., *Direct writing in three dimensions,* Mater. Today 7 (7-8) (2004) 32-39; G. M. Gratson, et al., *Microperiodic structures: direct writing of three-dimensional webs,* Nature 428 (6981) (2004) (p. 386-386); C. P. Ambulo, et al., *Four-dimensional printing of liquid crystal elastomers,* ACS Appl. Mater. Interfaces 9 (42) (2017) 37332-37339; A. Kotikian, et al., *3D printing of liquid crystal elastomeric actuators with spatially programed nematic order,* Adv. Mater. 30 (10) (2018) 17061641-17061646; J. A. Lewis, *Novel inks for direct writing in three dimensions,* Digital Fabrication 2005, Final Program and Proceedings, (2005): p. 142-142. The extruded filaments can be polymerized by applying UV light during the printing (for UV-curable resin) (see C. P. Ambulo, et al.; A. Kotikian, et al., *3D printing of liquid crystal elastomeric actuators with spatially programed nematic order,* Adv. Mater. 30 (2018), 1706164) or transferring the filaments into a heating oven for curing (for thermally-curable resin) (see B. G. Compton, et al.; A. S. Gladman, et al.; J. A. Lewis, 2006; J. A. Lewis, 2006). Different DIW printer heads have been conceptually designed by researchers to print continuous fiber-reinforced thermoset composites. See U.S. Pat. No. 10,173,410, J. A. Nardiello, et al., Device and method for 3D printing with long-fiber reinforcement, Jan. 8, 2019; U.S. Patent Application Publication No. 2017/0015060, J. Lewicki, et al., Additive manufacturing continuous filament carbon fiber epoxy composites, Jan. 19, 2017. However, to the knowledge of the present inventors, there is no detailed report on how to realize and practice these designs. For example, the J. Lewicki, et al. patent application proposes a DIW printing method for carbon fiber reinforced epoxy. According to the described technique, the fiber is fed into the syringe to meet the resin through a hollow tube. However, the backflow of resin at the end of the feeding tube would prevent the fiber extrusion. Continuous Composite Inc. (Coeur d' Alene, ID) patented the design of a DIW printer head for UV-curable thermoset composites with continuous fiber. See U.S. Pat. No. 9,987,798, K. Tyler, Method and apparatus for continuous composite three-dimensional printing, Jun. 5, 2018. According to the patent, the printer head includes a syringe for resin storage, a deposition nozzle, a feeder for continuous fiber, and a UV lamp for photo-polymerization. The fiber feeder connects to the syringe through a one-way check valve, which prevents the back-flow of liquid resin into the feeder. However, the check valve also applies considerable friction for fiber extrusion. Therefore, the deposited composite filaments are required to quickly solidify and stick to the stage during the printing, which provides a persistence force to hold the filament in place and pull the fiber when the printer head moves forward.

Due to the early stage of development, limitations exist in the current designs of printer heads for the continuous-fiber composites. First, the printable material is limited to the thermoplastics or thermosets with fast curing mechanism, such as the UV-curable resins or the recently developed resin with exothermic frontal polymerization. See I. D. Robertson, et al., *Rapid energy-efficient manufacturing of polymers and composites via frontal polymerization,* Nature 557 (7704) (2018) 223-227 (223-+); J. S. Moore, et al., *3D printing of thermoset polymers and composites,* (2017). There has been no robust design of a printer head to print thermally-curable continuous fiber composites, which are widely used in the composite industry. For example, it was reported that the thermally-curable epoxy, polyester, vinyl ester, and polyure-thane share over 91% of the global thermoset resin market in the composite industry. See S. Mazumdar, *Opportunities for thermoset resins in the composites industry,* (2008). Second, printed composites usually suffer from low quality and mechanical properties. When using thermoplastics or UV-curable resin as composite matrixes, the filament inter-faces are bonded primarily by the non-covalent bonds and thus exhibit weak interfacial strength. See R. Zou, et al., *Isotropic and anisotropic elasticity and yielding of 3D printed material,* Compos. Part B Eng. 99 (2016) 506-513; S. H. Ahn, et al., *Anisotropic material properties of fused deposition modeling ABS,* Rapid Prototyp. J. 8 (4) (2002) 248-257; Q. Sun, et al., *Effect of processing conditions on the bonding quality of FDM polymer filaments,* Rapid Pro-totyp. J. 14 (2) (2008) 72-80; I. Gibson, et al., *Additive Manufacturing Technologies: 3D Printing, Rapid Prototyp-ing, and Direct Digital Manufacturing,* 2nd ed., Springer, 2015 (ISBN 978-1-4939-2113-3). Third, due to the presence of gaps between solidified filaments, 3D-printed composites usually show significant void formation (~20%) (see X. Wang, et al.; M. Namiki, et al., *3D printing of continuous fiber reinforced plastic,* Proc. Soc. Adv. Mater. Process. Eng. (2014); J. Wang, et al., *A novel approach to improve mechanical properties of parts fabricated by fused deposi-tion modeling,* Mater. Des. 105 (2016) 152-159; H. L. Tekinalp, et al., *Highly oriented carbon fiber-polymer com-posites via additive manufacturing,* Compos. Sci. Technol. 105 (2014) 144-150), which generates stress concentration during the deformation and compromises the mechanical properties of the printed composites (see M. Namiki, et al.; F. V. D. Klift, et al., *3D printing of continuous carbon fibre reinforced thermo-plastic (CFRTP) tensile test specimens,* Open J. Compos. Mater. 6 (1) (2015) 18; T. H. J. Vaneker, *Material extrusion of continuous fiber reinforced plastics using commingled yarn,* 1st Cirp Conference on Composite Materials Parts Manufacturing (Cirp Ccmpm 2017), (2017) 66: p. 317-322).

A need, therefore, exists for improved devices, systems, and methods for three-dimensional printing of continuous fiber-reinforced thermoset composites, which may over-come one or more of the above-mentioned challenges asso-ciated with existing and proposed technology.

SUMMARY OF THE DISCLOSURE

The present disclosure provides printer heads, printer systems, and methods for three-dimensional printing of a continuous fiber-reinforced thermoset composite. In one aspect, a printer head for three-dimensional printing of a continuous fiber-reinforced thermoset composite is pro-vided. In one embodiment, the printer head may include a deposition syringe, a fiber housing, and a feeding tube. The deposition syringe may define a resin reservoir configured to contain a supply of a resin therein, an air chamber, and a first inlet port in fluid communication with the air chamber and configured to deliver a first flow of air thereto. The depo-sition syringe may include a syringe body, and a piston movably disposed within the syringe body. The syringe body may include an inlet section, a needle section defining an outlet, and a converging section disposed between the inlet section and the needle section. The fiber housing may define a fiber chamber configured to contain a supply of a fiber therein, and a second inlet port in fluid communication with the fiber chamber and configured to deliver a second flow of air thereto. The feeding tube may extend from the fiber chamber to the needle section, and the feeding tube may be configured to receive the second flow of air therein and to guide the fiber from the fiber chamber to the needle section.

In some embodiments, the resin reservoir may be defined at least in part by the piston and the syringe body. In some embodiments, the resin reservoir may be defined at least in part by the piston, the inlet section, and the converging section. In some embodiments, the air chamber may be defined at least in part by the piston and the syringe body. In some embodiments, the air chamber may be defined at least in part by the piston and the inlet section. In some embodi-ments, the air chamber may be defined at least in part by the piston, the inlet section, and the fiber housing. In some embodiments, the first inlet port may be defined in the inlet section. In some embodiments, the first inlet port may extend through a sidewall of the inlet section. In some embodiments, the first inlet port may be configured to deliver the first flow of air into the air chamber at a first pressure for moving the piston relative to the syringe body to cause the resin and the fiber to be extruded from the nozzle section. In some embodiments, the piston may be configured to translate relative to the syringe body to cause the resin and the fiber to be extruded from the nozzle section. In some embodiments, the printer head also may include a fiber reel disposed within the fiber housing and configured to receive the supply of the fiber wound thereon. In some embodiments, the fiber reel may be rotatably coupled to the fiber housing. In some embodiments, the second inlet port may extend through an outer wall of the fiber housing. In some embodiments, the second inlet port may be configured to deliver the second flow of air into the fiber chamber at a second pressure for inhibiting backflow of the resin into the feeding tube.

In some embodiments, the feeding tube may extend through the resin reservoir. In some embodiments, the feeding tube may extend through the air chamber. In some embodiments, the feeding tube may extend into the needle section. In some embodiments, the feeding tube may extend through the converging section. In some embodiments, the feeding tube may extend through the inlet section and the converging section. In some embodiments, the feeding tube may extend through a wall of the fiber housing, the inlet section, and the converging section. In some embodiments, the feeding tube may extend through the piston. In some embodiments, the piston may be configured to move relative to the feeding tube. In some embodiments, the feeding tube may extend coaxially with the syringe body. In some embodiments, the printer head also may include a first tube coupled to the first inlet port and configured to deliver the first flow of air thereto, and a second tube coupled to the second inlet port and configured to deliver the second flow of air thereto. In some embodiments, the printer head also may include the supply of the resin contained within the resin reservoir, and the supply of the fiber contained within the fiber chamber.

In another aspect, a printer system for three-dimensional printing of a continuous fiber-reinforced thermoset composite is provided. In one embodiment, the printer system may include a motion stage, a printer head coupled to the motion stage, and a dispenser. The printer head may include a deposition syringe, a fiber housing, and a feeding tube. The deposition syringe may define a resin reservoir configured to contain a supply of a resin therein, an air chamber, and a first inlet port in fluid communication with the air chamber and configured to deliver a first flow of air thereto. The deposition syringe may include a syringe body, and a piston movably disposed within the syringe body. The syringe body may include an inlet section, a needle section defining an outlet, and a converging section disposed between the inlet section and the needle section. The fiber housing may define a fiber chamber configured to contain a supply of a fiber therein, and a second inlet port in fluid communication with the fiber chamber and configured to deliver a second flow of air thereto. The feeding tube may extend from the fiber chamber to the needle section, and the feeding tube may be configured to receive the second flow of air therein and to guide the fiber from the fiber chamber to the needle section. The dispenser may be in fluid communication with the first inlet port and the second inlet port, and the dispenser may be configured to control a first pressure of the first flow of air and a second pressure of the second flow of air.

In some embodiments, the resin reservoir may be defined at least in part by the piston and the syringe body. In some embodiments, the resin reservoir may be defined at least in part by the piston, the inlet section, and the converging section. In some embodiments, the air chamber may be defined at least in part by the piston and the syringe body. In some embodiments, the air chamber may be defined at least in part by the piston and the inlet section. In some embodiments, the air chamber may be defined at least in part by the piston, the inlet section, and the fiber housing. In some embodiments, the first inlet port may be defined in the inlet section. In some embodiments, the first inlet port may extend through a sidewall of the inlet section. In some embodiments, the first inlet port may be configured to deliver the first flow of air into the air chamber at the first pressure for moving the piston relative to the syringe body to cause the resin and the fiber to be extruded from the nozzle section. In some embodiments, the piston may be configured to translate relative to the syringe body to cause the resin and the fiber to be extruded from the nozzle section. In some embodiments, the printer head also may include a fiber reel disposed within the fiber housing and configured to receive the supply of the fiber wound thereon. In some embodiments, the fiber reel may be rotatably coupled to the fiber housing. In some embodiments, the second inlet port may extend through an outer wall of the fiber housing. In some embodiments, the second inlet port may be configured to deliver the second flow of air into the fiber chamber at the second pressure for inhibiting backflow of the resin into the feeding tube.

In some embodiments, the feeding tube may extend through the resin reservoir. In some embodiments, the feeding tube may extend through the air chamber. In some embodiments, the feeding tube may extend into the needle section. In some embodiments, the feeding tube may extend through the converging section. In some embodiments, the feeding tube may extend through the inlet section and the converging section. In some embodiments, the feeding tube may extend through a wall of the fiber housing, the inlet section, and the converging section. In some embodiments, the feeding tube may extend through the piston. In some embodiments, the piston may be configured to move relative to the feeding tube. In some embodiments, the feeding tube may extend coaxially with the syringe body. In some embodiments, the printer system also may include a first tube extending between the dispenser and the first inlet port, the first tube configured to deliver the first flow of air to the first inlet port, and a second tube extending between the dispenser and the second inlet port, the second tube configured to deliver the second flow of air to the second inlet port. In some embodiments, the printer system also may include the supply of the resin contained within the resin reservoir, and the supply of the fiber contained within the fiber chamber.

In still another aspect, a method for three-dimensional printing of a continuous fiber-reinforced thermoset composite is provided. In one embodiment, the method may include positioning a printer head relative to a work surface. The printer head may include a deposition syringe, a fiber housing, and a feeding tube. The deposition syringe may define a resin reservoir containing a supply of a resin therein, an air chamber, and a first inlet port in fluid communication with the air chamber. The deposition syringe may include a syringe body, and a piston movably disposed within the syringe body. The syringe body may include an inlet section, a needle section defining an outlet, and a converging section disposed between the inlet section and the needle section. The fiber housing may define a fiber chamber containing a supply of a fiber therein, and a second inlet port in fluid communication with the fiber chamber. The feeding tube may extend from the fiber chamber to the needle section, and the feeding tube may be configured to guide the fiber from the fiber chamber to the needle section. The method also may include causing a first flow of air to be delivered via the first inlet port into the air chamber at a first pressure, and causing a second flow of air to be delivered via the second inlet port into the fiber chamber at a second pressure.

In some embodiments, the second pressure may be different from the first pressure. In some embodiments, the second pressure may be less than the first pressure. In some embodiments, the method also may include determining the second pressure based at least in part on the first pressure and an apparent viscosity of the resin. In some embodiments, the delivery of the first flow of air via the first inlet port into the air chamber at the first pressure may generate a third pressure within the syringe body at a junction between the converging section and the needle section, and the second pressure may be equal to the third pressure. In some embodiments, the delivery of the first flow of air via the first inlet port into the air chamber at the first pressure may cause the piston to move relative to the syringe body such that the resin and the fiber are extruded from the nozzle section. In some embodiments, the delivery of the second flow of air via the second inlet port into the fiber chamber at the second pressure may cause the second flow of air to pass into the feeding tube. In some embodiments, the delivery of the second flow of air via the second inlet port into the fiber chamber at the second pressure may cause the second flow of air to pass into the feeding tube such that backflow of the resin into the feeding tube is inhibited.

In some embodiments, the resin reservoir may be defined at least in part by the piston and the syringe body. In some embodiments, the resin reservoir may be defined at least in part by the piston, the inlet section, and the converging section. In some embodiments, the air chamber may be defined at least in part by the piston and the syringe body. In some embodiments, the air chamber may be defined at least in part by the piston and the inlet section. In some embodiments, the air chamber may be defined at least in part by the piston, the inlet section, and the fiber housing. In some embodiments, the first inlet port may be defined in the inlet section. In some embodiments, the first inlet port may extend through a sidewall of the inlet section. In some embodiments, the printer head also may include a fiber reel disposed within the fiber housing, and the supply of the fiber may be wound on the fiber reel. In some embodiments, the fiber reel may be rotatably coupled to the fiber housing. In some embodiments, the second inlet port may extend through an outer wall of the fiber housing.

In some embodiments, the feeding tube may extend through the resin reservoir. In some embodiments, the feeding tube may extend through the air chamber. In some embodiments, the feeding tube may extend into the needle section. In some embodiments, the feeding tube may extend through the converging section. In some embodiments, the feeding tube may extend through the inlet section and the converging section. In some embodiments, the feeding tube may extend through a wall of the fiber housing, the inlet section, and the converging section. In some embodiments, the feeding tube may extend through the piston. In some embodiments, the piston may be configured to move relative to the feeding tube. In some embodiments, the feeding tube may extend coaxially with the syringe body.

In some embodiments, the method also may include causing, via a motion stage, the printer head to move relative to the work surface while the first flow of air is delivered via the first inlet port into the air chamber at the first pressure and while the second flow of air is delivered via the second inlet port into the fiber chamber at the second pressure. In some embodiments, the first flow of air may be delivered from a dispenser to the first inlet port via a first tube, and the second flow of air may be delivered from the dispenser to the second inlet port via a second tube. In some embodiments, the resin may include a thermally-curable resin. In some embodiments, the resin may include a UV-curable resin. In some embodiments, the resin may include a polyimine thermoset resin. In some embodiments, the fiber may include a carbon fiber. In some embodiments, the fiber may include a glass fiber.

These and other aspects and improvements of the present disclosure will become apparent to one of ordinary skill in the art upon review of the following detailed description when taken in conjunction with the several drawings and the appended claims.

BRIEF DESCRIPTION OF THE DRAWINGS

FIG. 3 schematically illustrates composite filament extrusion via the printer head of FIG. 2 using different values of the second pressure relative to a junction pressure at the junction between a converging section and the needle section of the deposition syringe.

FIG. 4 illustrates example composite filaments extruded via the printer head of FIG. 2 and example data related to the extrusion of example composite filaments.

FIG. 5 illustrates mechanical properties of example thermally-curable composites printed via the printer head of FIG. 2 and example data related to the thermally-curable composites.

FIG. 6 illustrates mechanical properties of example composites with different fiber contents printed via the printer head of FIG. 2 and example data related to the printed composites compared to data from existing studies on composite 3D printing.

FIG. 7 illustrates example composite structures printed via the printer head of FIG. 2 and recyclable 3D printing of the composite structures.

FIG. 8 illustrates example structures printed via the printer head of FIG. 2. FIG. 8D shows perspective views of an example composite laminate being laid on a spherical surface and the example 3D printed structure formed thereby. FIG. 8E shows a perspective view of an example composite laminate laid on a wavy surface.

FIG. 9 illustrates an example two-stage UV-curable resin as may be used with the printer head of FIG. 2 and example data related to 3D printed composites formed using the two-stage UV-curable resin.

FIG. 10 illustrates an example use of a six-axis robotic arm for moving the printer head of FIG. 2 and example structures printed using the six-axis robotic arm and the printer head.

Figure 1:
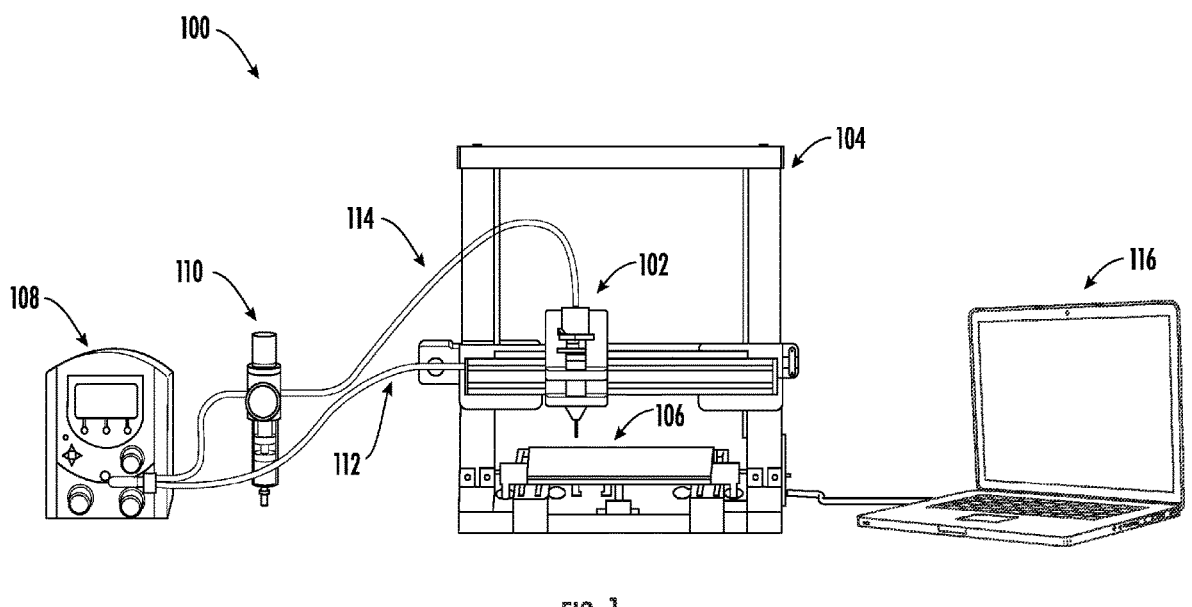
FIG. 1 is a plan view of an example printer system for three-dimensional printing of a continuous fiber-reinforced thermoset composite in accordance with one or more embodiments of the disclosure, the printer system including a motion stage, a printer head having a deposition syringe, a dispenser having a regulator, and a computer implementing computer-aided design software.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances, well-known methods, procedures, and components have not been described in detail so as not to unnecessarily obscure aspects of the embodiments.

Overview

Embodiments of printer heads, printer systems, and methods for three-dimensional printing of a continuous fiber-reinforced thermoset composite are provided herein. As explained below, the disclosed printer heads, printer systems, and methods may overcome certain limitations associated with existing techniques for the three-dimensional printing of continuous fiber-reinforced thermoset composites.

In some embodiments, the printer head may include a deposition syringe, a fiber housing, and a feeding tube. The deposition syringe may define a resin reservoir configured to contain a supply of a resin therein, an air chamber, and a first inlet port in fluid communication with the air chamber and configured to deliver a first flow of air thereto. The deposition syringe may include a syringe body, and a piston movably disposed within the syringe body. The syringe body may include an inlet section, a needle section defining an outlet, and a converging section disposed between the inlet section and the needle section. The fiber housing may define a fiber chamber configured to contain a supply of a fiber therein, and a second inlet port in fluid communication with the fiber chamber and configured to deliver a second flow of air thereto. The feeding tube may extend from the fiber chamber to the needle section, and the feeding tube may be configured to receive the second flow of air therein and to guide the fiber from the fiber chamber to the needle section. In some embodiments, the printer head may include or may be used with a cutting device, such as a scissor, disposed below the outlet of the needle section and configured to selectively cut the fiber-reinforced thermoset composite on demand.

In some embodiments, the printer system may include a motion stage, a printer head coupled to the motion stage, and a dispenser. The printer head may include a deposition syringe, a fiber housing, and a feeding tube. The deposition syringe may define a resin reservoir configured to contain a supply of a resin therein, an air chamber, and a first inlet port in fluid communication with the air chamber and configured to deliver a first flow of air thereto. The deposition syringe may include a syringe body, and a piston movably disposed within the syringe body. The syringe body may include an inlet section, a needle section defining an outlet, and a converging section disposed between the inlet section and the needle section. The fiber housing may define a fiber chamber configured to contain a supply of a fiber therein, and a second inlet port in fluid communication with the fiber chamber and configured to deliver a second flow of air thereto. The feeding tube may extend from the fiber chamber to the needle section, and the feeding tube may be config-ured to receive the second flow of air therein and to guide the fiber from the fiber chamber to the needle section. The dispenser may be in fluid communication with the first inlet port and the second inlet port, and the dispenser may be configured to control a first pressure of the first flow of air and a second pressure of the second flow of air.

In some embodiments, the method may include position-ing a printer head relative to a work surface. The printer head may include a deposition syringe, a fiber housing, and a feeding tube. The deposition syringe may define a resin reservoir containing a supply of a resin therein, an air chamber, and a first inlet port in fluid communication with the air chamber. The deposition syringe may include a syringe body, and a piston movably disposed within the syringe body. The syringe body may include an inlet section, a needle section defining an outlet, and a converging section disposed between the inlet section and the needle section. The fiber housing may define a fiber chamber containing a supply of a fiber therein, and a second inlet port in fluid communication with the fiber chamber. The feeding tube may extend from the fiber chamber to the needle section, and the feeding tube may be configured to guide the fiber from the fiber chamber to the needle section. The method also may include causing a first flow of air to be delivered via the first inlet port into the air chamber at a first pressure, and causing a second flow of air to be delivered via the second inlet port into the fiber chamber at a second pressure. Further details of various embodiments of the disclosed printer heads, printer systems, and methods are provided herein.

As discussed below, a versatile 3D printing method for continuous fiber-reinforced thermoset composites was developed, which removes the limitations of printable res-ins. The method leverages the shear stress imposed on the fiber by the viscous ink to enable the ready extrusion of composite filaments and is applicable to a wide variety of thermally curable and UV-curable composites. To demon-strate the versatility of the developed printing method, a thermally-curable polyimine and UV-curable acrylate were respectively adopted as the composite matrix. After printing polyimine composites, the components were transferred into an oven for post-curing. The interfacial polymerization led to strong interfaces connected by the covalent bonds. During the post-curing, the slight viscous flow of thermoset resin helped close the micro-voids between filaments and thus improved the mechanical performance of printed compos-ites. In this manner, the printed composite laminates exhib-ited comparable stiffness and strength to directly molded samples. The developed printing method was also applied to printing photo-curable composites with UV sources attached to the sides of the printer head. During the printing, the matrix resin quickly solidified and held the composite fila-ments in place. Because there was negligible force applied to the filaments after their extrusion, the developed printing method enabled free-standing 3D printing without sacrificial materials and the deposition of the composite layer on curved surfaces. Overall, the developed system provides a robust platform for printing thermoset composites with essentially no restriction on printable materials and fibers, which greatly facilitates the digital design and rapid proto-typing of modern composite products. The method also dramatically expands the scope of printable materials for emerging technologies in 4D printing, biomedical printing, and the printing of functional devices.

Still other benefits and advantages of the devices, sys-tems, and methods for three-dimensional printing of con-tinuous fiber-reinforced thermoset composites provided herein over existing and proposed techniques will be appre-ciated by those of ordinary skill in the art from the following description and the appended drawings.

Example Printer Heads, Printer Systems, and Methods

Referring now to FIG. 1, an example printer system 100 for three-dimensional printing of a continuous fiber-rein-forced thermoset composite is depicted. As shown, the printer system 100 may include a printer head 102, a motion stage 104, a work surface 106, a dispenser 108, a regulator 110, a first tube 112, a second tube 114, and a computing device 116. The motion stage 104 may be configured to facilitate movement of the printer head 102 relative to the work surface 106 on which a composite is to be formed during 3D printing operations. The motion stage 104 gen-erally may be formed in a conventional manner. The printer head 102 may be coupled to the motion stage 104 and configured to move therewith relative to the work surface 106 during 3D printing operations. In some embodiments, as discussed below with respect to FIG. 10, the printer system 100 may include a robotic arm instead of a motion stage 104. In such embodiments, the printer head 102 may be coupled to the robotic arm and configured to move therewith relative to the work surface 106 during 3D printing operations. As described below with respect to FIG. 2, the printer head 102 may include a deposition syringe for extruding a composite laminate. The computing device 116 may be in operable communication with the motion stage 104 (or the robotic arm) and configured to direct the motion stage 104 (or the robotic arm) to move the printer head 102 during 3D printing operations in accordance with a composite to be printed. The computing device 116 may implement CAD software, and the movement of the printer head 102 during 3D printing operations may be based at least in part on a CAD model corresponding to the composite to be printed. The dispenser 108 may be in fluid communication with respective inlet ports of the printer head 102 and configured to control the pressures of respective flows of air delivered to the printer head 102 during 3D printing operations, as described below. As shown, the dispenser 108 may include the regulator 110 configured to regulate the pressure of one or more of the flows of air delivered to the printer head 102. The flows of air may be delivered from the dispenser 108 to the printer head 102 via the first tube 112 and the second tube 114 extending therebetween. It will be appreciated that the printer system 100 depicted in FIG. 1 is merely one example of the disclosed embodiments, and that various other con-figurations of the printer system 100 may be used in other embodiments.

Figure 2:
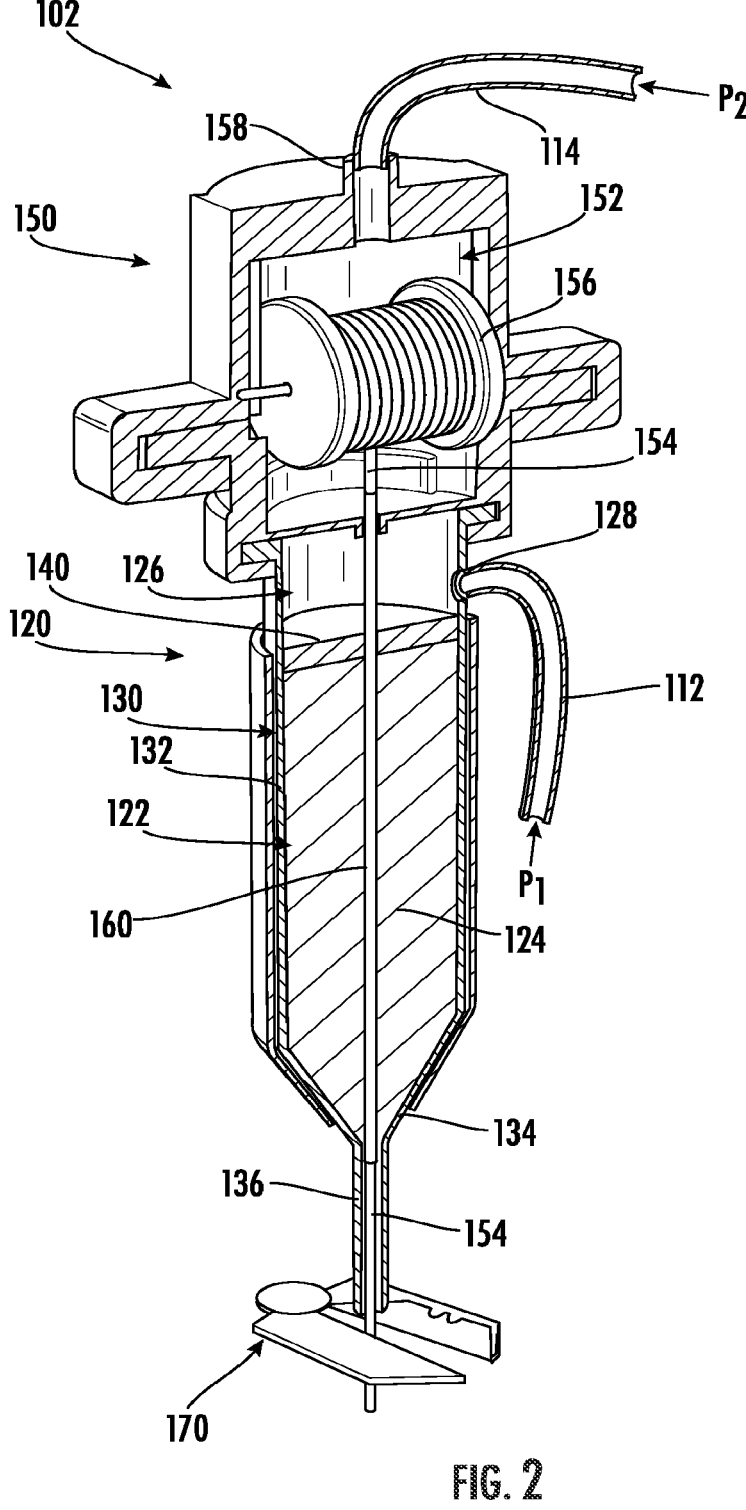
FIG. 2 is a perspective partial cross-sectional view of an example printer head as may be used with the printer system of FIG. 1 in accordance with one or more embodiments of the disclosure, the printer head including a deposition syringe having a resin reservoir for containing a supply of a resin ink and an air chamber for receiving a first flow of air at a first pressure, a fiber housing having a fiber chamber for containing a supply of a fiber and for receiving a second flow of air at a second pressure, a feeding tube for guiding the fiber to a needle section of the deposition syringe, and a scissor for selectively cutting the fiber-reinforced thermoset composite on demand.

FIG. 2 shows an example printer head 102 for three-dimensional printing of a continuous fiber-reinforced ther-moset composite. The printer head 102 may be used as a part of the printer system 100 of FIG. 1, although it will be appreciated that the illustrated printer head 102 may be used as a part of other types of printer systems according to various other embodiments. As shown, the printer head 102 may include a deposition syringe 120, a fiber housing 150, a feeding tube 160, and a cutting device 170. As described below, the printer head 102 may be used to extrude a continuous fiber-reinforced thermoset composite filament including a resin 124 and a fiber 154. A supply of the resin 124 may be contained within the deposition syringe 120, and a supply of the fiber 154 may be contained within the fiber housing 150 for use during 3D printing operations. The cutting device 170, which as shown may be configured as a scissor, may be configured for selectively cutting the fiber-reinforced thermoset composite filament, when desired, for example at the end of a printing operation.

The deposition syringe 120 may define a resin reservoir 122 configured to contain the supply of the resin 124 therein, an air chamber 126, and a first inlet port 128 in fluid communication with the air chamber 126 and configured to deliver a first flow of air thereto. The deposition syringe 120 may include a syringe body 130 and a piston 140 movably disposed within the syringe body 130. Specifically, the piston 140 may be configured to translate within the syringe body 130 to facilitate delivery of the resin 124 from the resin reservoir 122 and out of the deposition syringe 120, as described below. As shown, the syringe body 130 may include an inlet section 132, a needle section 136 defining an outlet, and a converging section 134 disposed between the inlet section 132 and the needle section 136. The inlet section 132 may extend from an inlet end of the syringe body 130 to the converging section 134, the converging section 134 may extend from the inlet section 132 to the needle section 136, and the needle section 136 may extend from the converging section 134 to an outlet end of the syringe body 130. As shown, the inlet section 132 may have a first diameter than is constant along the length of the inlet section 132, and the needle section 136 may have a second diameter that is constant along the length of the needle section 136 and is smaller than the first diameter. The converging section 134 may have a varying diameter along the length of the converging section 134, as the syringe body 130 transitions from the first diameter to the second diameter. The converging section 134 may be connected to the needle section 136 at a junction. The resin reservoir 122 may be defined at least in part by the piston and the syringe body. As shown, the resin reservoir 122 may be defined at least in part by the piston 140, the inlet section 132, and the converging section 134. The air chamber 126 may be defined at least in part by the piston 140 and the syringe body 130. As shown, the air chamber 126 may be defined at least in part by the piston 140 and the inlet section 132. In some embodiments, as shown, the air chamber 126 may be defined at least in part by the piston 140, the inlet section 132, and the fiber housing 150. The first inlet port 128 may be defined in the inlet section 132. As shown, the first inlet port 128 may extend through a sidewall of the inlet section 132, and the first tube 112 may be coupled to the first inlet port 128. As described below, the first inlet port 128 may be config-ured to deliver the first flow of air into the air chamber 126 at a first pressure $P_1$ for moving the piston 140 relative to the syringe body 130 to cause the resin 124 and the fiber 154 to be extruded from the nozzle section 136. Specifically, upon delivery of the first flow of air into the air chamber 126 at the first pressure $P_1$, the piston 140 may translate relative to the syringe body 130 to cause the resin 124 and the fiber 154 to be extruded from the nozzle section 136.

The fiber housing 150 may define a fiber chamber 152 configured to contain the supply of the fiber 154 therein, and a second inlet port 158 in fluid communication with the fiber chamber 152 and configured to deliver a second flow of air thereto. In some embodiments, the fiber housing 150 may be coupled, either removably or fixedly, to the deposition syringe 120, such as the syringe body 130 thereof. In some embodiments, as shown, the fiber housing 150 may include a first housing member that is coupled to the syringe body 130, and a second housing member that is coupled to the first housing member. The second housing member may be removably coupled to the first housing member to allow the supply of fiber 154 to be easily replenished after use. In some embodiments, as shown, a fiber reel 156 may be disposed within the fiber housing 150 and configured to receive the supply of the fiber 154 wound thereon. The fiber reel 156 may be rotatably coupled to the fiber housing 150 within the fiber chamber 152 to allow the fiber 154 to be unwound therefrom. As shown, the second inlet port 158 may extend through an outer wall of the fiber housing 150, and the second tube 114 may be coupled to the second inlet port 158. As described below, the second inlet port 158 may be configured to deliver the second flow of air into the fiber chamber 152 at a second pressure $P_2$ for inhibiting backflow of the resin 124 into the feeding tube 160.

The feeding tube 160 may extend from the fiber chamber 152 of the fiber housing 150 to the needle section 136 of the syringe body 130. As shown, the feeding tube 160 may be configured to receive the second flow of air therein and to guide the fiber 154 from the fiber chamber 152 to the needle section 136. In some embodiments, as shown, the feeding tube 160 may extend from the fiber chamber 152, through the air chamber 126, through the resin reservoir 122, and to the needle section 136. In this manner, the feeding tube 160 may extend through a wall of the fiber housing 150, the inlet section 132, and the converging section 134 to the needle section 136. In some embodiments, as shown, the feeding tube 160 may extend partially into the needle section 136. In some embodiments, as shown, the feeding tube 160 may extend through the piston 140. Specifically, the feeding tube 160 may extend through an opening of the piston 140, with an outer diameter of the feeding tube 160 and an inner diameter of the opening of the piston 140 providing a tight fit for sealing the interface between the feeding tube 160 and the piston 140 to inhibit passage of air or the resin through the interface. As described above, the piston 140 may be configured to translate relative to the syringe body 130. Specifically, the piston 140 may be configured to translate relative to the syringe body 130 and the feeding tube 160, while the feeding tube 160 remains fixed relative to the syringe body 130, for example, by the feeding tube 160 being fixedly coupled to the fiber housing 150. In some embodiments, as shown, the feeding tube 160 may extend coaxially with the syringe body 130.

The tubes 112, 114 may be coupled to the respective inlet ports 128, 158 of the printer head 102 to facilitate delivery of the respective flows of air thereto. As shown, the first tube 112 may be coupled to the first inlet port 128 and configured to deliver the first flow of air thereto, and the second tube 114 may be coupled to the second inlet port 158 and configured to deliver the second flow of air thereto. As discussed above with respect to FIG. 1, the first flow of air may be delivered from the dispenser 108 to the first inlet port 128 via the first tube 112, and the second flow of air may be delivered from the dispenser 108 to the second inlet port 158 via the second tube 114. Further, the regulator 110 of the dispenser 108 may be used to regulate the pressure of one or both of the flows of air. As shown, the cutting mechanism 170 may be provided adjacent to the needle section 136 of the syringe body 130 and configured for cutting a composite filament extruded therefrom. In some embodiments, the cutting mechanism 170 may include a scissor, although other forms of suitable cutting mechanisms may be used in other embodiments. In some embodiments, the cutting mechanism 170 may be disposed below the outlet of the needle section 136 and configured to selectively cut the fiber-reinforced thermoset composite on demand, for example, automatically at the end of a printing operation. It will be appreciated that the printer head 102 depicted in FIG. 2 is merely one example of the disclosed embodiments, and that various other configurations of the printer head 102 may be used in other embodiments.

During the use of the printer head 102 for 3D printing, the printer head 102 may be positioned relative to the work surface 106, for example, using the motion stage 104 or a robotic arm. To commence the extrusion of a composite filament from the printer head 102, the first flow of air may be delivered via the first inlet port 128 into the air chamber 126 at the first pressure $P_1$. Specifically, the dispenser 108 may cause the first flow of air to be delivered via the first inlet port 128 into the air chamber 126 at the first pressure $P_1$. The delivery of the first flow of air at the first pressure $P_1$ may cause the piston 140 to move relative to the syringe body 130 such that the resin 124 and the fiber 154 are extruded from the nozzle section 136. Specifically, the movement of the piston 140 may cause the resin 124 to flow through the nozzle section 136 and be deposited from the nozzle section 136, and the viscous flow of the resin 124 within the needle section 136 may apply shear stress on the fiber 154 within the needle section 136, thereby causing the fiber 154 to be advanced through and out of the nozzle section 136 along with the resin 124. While the first flow of air is being delivered via the first inlet port 128 into the air chamber 126 at the first pressure $P_1$, the second flow of air may be delivered via the second inlet port 158 into the fiber chamber 152 at the second pressure $P_2$. Specifically, the dispenser 108 may cause the second flow of air to be delivered via the second inlet port 158 into the fiber chamber 152 at the second pressure $P_2$. The delivery of the second flow of air at the second pressure $P_2$ may cause the second flow of air to pass into the feeding tube 160. Specifically, the delivery of the second flow of air at the second pressure $P_2$ may cause the second flow of air to pass into the feeding tube 160 such that the backflow of the resin 124 into the feeding tube 160 is inhibited. The second pressure $P_2$ may be different from the first pressure $P_1$. In some embodiments, the second pressure $P_2$ may be less than the first pressure $P_1$. As described below, the second pressure $P_2$ may be determined based at least in part on the first pressure $P_1$ and the apparent viscosity of the resin. It will be appreciated that the delivery of the first flow of air via the first inlet port 128 into the air chamber 126 at the first pressure $P_1$ may generate a third pressure (i.e., a junction pressure) within the syringe body 130 at the junction between the converging section 134 and the needle section 136, which may encourage backflow of the resin 124 into the feeding tube 160. As described below, the third pressure may be calculated using a model, with the first pressure $P_1$ and the apparent viscosity of the resin 124 being inputs for the model. In some embodiments, the second pressure $P_2$ may be equal to, or substantially equal to (e.g., within +/−5%, +/−4%, +/−3%, +/−2%, or +/−1% of) the third pressure. In this manner, the delivery of the second flow of air at the second pressure $P_2$ may inhibit the backflow of the resin 124 into the feeding tube 160, thereby allowing smooth deposition of the composite filament from the needle section 136 and onto the work surface 106 for forming a composite structure. During 3D printing operations, the printer head 102 may be moved relative to the work surface 106, such as via the motion stage 104 or a robotic arm, while the first flow of air is delivered via the first inlet port 128 into the air chamber 126 at the first pressure $P_1$ and while the second flow of air is delivered via the second inlet port 158 into the fiber chamber 152 at the second pressure $P_2$. Various types of resins and fibers may be used with the printer head. In some embodiments, the resin may include a thermally-curable resin. In some embodiments, the resin 124 may include a UV-curable resin, such as a two-stage UV-curable resin. In some embodiments, the resin 124 may include a polyimine thermoset resin. In some embodiments, the fiber 154 may include a carbon fiber. In some embodiments, the fiber 154 may include a glass fiber. Still other types of resins and fibers may be used for 3D printing with the printer head 102 according to other embodiments.

Examples and Experimental Data

The following describes example devices, systems, and methods for three-dimensional printing of continuous fiber-reinforced thermoset composites in accordance with the present disclosure, as well as example data obtained by experimental studies. Supplementary Material, as referenced herein, is accessible online at doi:10.1016/j.addma.2021.101921 and is expressly incorporated herein by reference in its entirety.

Material and Methods

An example DIW printer setup, in accordance with the configuration shown in FIG. 1, was developed for the experimental studies described below. The printing head included a deposition syringe connected to a digital pneumatic regulator (Ultimus V high precision dispenser, Nordson EFD). The regulator was able to provide a deposition pressure ranging from 0 to 100 psi. The deposition syringe was mounted onto a moving stage (Makerbot, New York, NY), and its motion was controlled by a computer. A digital dispenser provided a controlled pressure, which was split into two streams, $P_1$ and $P_2$, and applied to the deposition syringe.

Design of the Printer Head

The detailed design of the printer head corresponds to that illustrated in FIG. 2. The thermoset resin with a suitable viscosity was loaded in the syringe as the printable ink. The commercial carbon fiber bundle (with 6 k T300 carbon fibers, diameter ~9 μm) without chemical treatment was fed into the syringe through a feeding tube. According to various uses, other types of high-strength fibers (e.g., glass fiber) can also be adopted as composite reinforcement. Two pressures were supplied to the deposition syringe ($P_1$ and $P_2$). When the deposition pressure $P_1$ is applied, it pushes the piston for ink deposition. The ink viscous flow within the needle section applies shear stress on the fiber, which drives the flow of the fiber through the nozzle. To prevent the backflow of the ink into the feeding tube, a positive pressure $P_2$ was applied on the top to balance the pressure at the end of the tube. Compared to the existing designs of printer heads, the presented configuration does not require the filament to quickly solidify because (i) the driving force for filament extrusion is provided by the shear stress applied on the fiber by viscous resin, and (ii) the design uses a pressure ($P_2$) to prevent the ink backflow, which does not apply notable frictions to resist the fiber extrusion. It is important to note that the designed printer head is independent of the dynamics of the motion stage and thus can be readily connected to other printing platforms.

Preparation of Thermally- and UV-Curable Printable Inks

The developed printing method for thermoset composites has great potential in printing a wide variety of thermally- and UV-curable resins. For thermally-curable resin, the printable inks can be prepared by partially curing the monomers and cross-linkers at high temperatures until suitable rheological properties are reached. Nano-clay can be added into the mixture to introduce the shear thinning effect and enhance the ink shear strength. In this study, a polyimine thermoset was adopted. The printable ink was prepared by mixing the monomer terephthaldehyde (dialdehyde), monomer diethylenetriamine (diamine), and cross-linker tris (2-aminoethyl) amine. All these chemicals were purchased from Sigma Aldrich (St. Louis, MO, USA), and their detailed chemical structures are shown in the Supplementary Material (Section S1). According to Taynton et al. (*Heat- or water-driven malleability in a highly recyclable covalent network polymer,* Adv. Mater. 26 (23) (2014) 3938-3942), the mole ratio among these chemicals is 1:0.3:0.467, and the curing temperature is between 75° C. and 105° C.

An alternative approach to prepare the thermally-curable polyimine inks is to utilize the solvent-assisted recycling mechanism. See K. Yu, et al., *Carbon fiber reinforced thermoset composite with near 100% recyclability,* Adv. Funct. Mater. 26 (33) (2016) 6098-6106; X. Shi, et al., *Primary recycling of anhydride-cured engineering epoxy using alcohol solvent,* Polym. Eng. Sci. 59 (S2) (2018) E111-E119; X. He, et al., *Recyclable* 3D *printing of polyimine-based covalent adaptable network polymers,* 3D Print. Addit. Manuf. 6 (1) (2019) 31-39; X. Shi, et al., *A multiscale chemomechanics theory for the solvent-assisted recycling of covalent adaptable network polymers,* J. Mech. Phys. Solids 138 (2020), 103918; K. Yu, et al., *Dissolution of covalent adaptable network polymers in organic solvent,* J. Mech. Phys. Solids 109 (2017) 78-94. The polyimine networks contain imine bonds in the backbone. When the polymer is soaked in the amine-containing solvents, the amine molecules diffuse into the network, break the imine bonds through bond exchange reactions (see C. N. Bowman, et al., *Covalent adaptable networks: reversible bond structures incorporated in polymer networks,* Angew. Chem. Int. Ed. 51 (18) (2012) 4272-4274; C. J. Kloxin, et al., *Covalent adaptable networks (CANS): a unique paradigm in cross-linked polymers,* Macromolecules 43 (6) (2010) 2643-2653; X. He, et al., *Cyclic welding behavior of covalent adaptable network polymers,* J. Polym. Sci. Part B Polym. Phys. 56 (5) (2018) 402-413; K. Yu, et al., *Reprocessing and recycling of thermosetting polymers based on bond exchange reactions,* RSC Adv. 4 (20) (2014) 10108-10117; C. Luo, et al., *Chemomechanics in the moisture-induced malleability of polyimine-based covalent adaptable networks,* Macromolecules 51 (23) (2018) 9825-9838; C. Luo, et al., *Effects of bond exchange reactions and relaxation of polymer chains on the thermomechanical behaviors of covalent adaptable network polymers,* Polymer 153 (2018) 43-51; C. Luo, et al., *Chemomechanics of dual-stage reprocessable thermosets,* J. Mech. Phys. Solids 126 (2019) 168-186), and eventually depolymerize the network. Because the reactions are reversible, re-polymerization can occur via heating the decomposed polymer solution in an open environment. Based on this recycling mechanism, a fully-cured polyimine thermoset was first decomposed in propylamine solvent at 50° C. for 30 mins, which produced a mixture of starting monomer, crosslinker, and excessive solvent. Nanoclay was then added, and the mixture was heated at 80° C. with a vacuum level of 8 kPa. After evaporating the excessive solvent, re-polymerization was triggered, which increased the mixture viscosity. Both of these two approaches are equally effective for producing thermally-curable printable inks with suitable viscosity. In this study, the second approach was adopted when examining the repeatability of the developed printing method.

The printable acrylate ink for UV-curable thermosets and their composites was prepared by mixing monomer 2-hydroxy-3-phenoxypropyl acrylate and crosslinker bisphenol A glycerolate diacrylate. Their mole ratio was 1:2. The detailed chemical structures are shown in the Supplementary Material. 2 wt % of diphenyl (2,4,6-trimethylbenzoly) phosphine oxide (compared to the total weight of solution) was added into the mixture as the photoinitiator. All the chemicals were purchased from Sigma Aldrich.

Ink Rheological Measurements

To print the thermally-curable polyimine composites, the ink rheological properties are important to control so the printouts can maintain their filament geometry after extrusion. The rheological properties of the prepared polyimine ink were measured using a rheometer (TA Instruments, AR-G2, New Castle, DE, USA). It was equipped with parallel plates with a diameter of 20 mm and a plate gap of 1 mm. To determine the rate-dependent viscosity, viscometry measurements were first carried out at room temperature, and the shear rate ranged from $10^{-3}$ to 200 s$^{-1}$. To determine the shear modulus of the polyimine ink, oscillatory measurements were performed at a frequency of 1 Hz within the stress range of 0.01-10,000 Pa. The measured shear modulus was used to identify the shear-yielding stress, which was taken to be the stress when the modulus started to drop abruptly.

Post Curing

Right after printing the polyimine composites, the matrix contained unreacted solvents and remained in the gel state. A post-curing step was therefore needed to fully polymerize the material. The post-curing was performed in a vacuum oven with 8 kPa vacuum pressure applied. To avoid the melting of the polyimine matrix, the initial heating temperature was set to 45° C. After being heated for 2 h, the polyimine matrix gained sufficient modulus and could maintain the composite structure. Subsequently, the temperature was further increased to 80° C. After being heated for another 6 h, the printed polyimine composites were fully polymerized.

Uniaxial Tension

To examine the mechanical properties (e.g., elastic modulus and strength) of the printed thermosets and their composites, uniaxial tension tests were performed on a Bose electro-force test instrument (3200 series II, New Eden Prairie, MN, USA). The specimen dimension for uniaxial tension tests was 20 mm in width and 45 mm in length. The specimen had three printed layers, and its thickness was roughly three times the filament diameter. All the tension tests were performed at room temperature (~23° C.) with a strain loading rate of 2%/s. After tests, the initial elastic modulus was calculated from the initial loading stage at 2% engineering strain, and the ultimate strength was also reported.

Selection of Deposition Pressure for Filament Extrusion

To enable the steady extrusion of composite filaments, the ink rheological properties and deposition pressures ($P_1$ and $P_2$) are important parameters to control. For the filament-based DIW process, the printable ink is required to readily flow through fine nozzles assisted by its shear-thinning effect and retains the filamentary form upon deposition due to a high modulus and yielding stress. Typical values of the ink apparent viscosity and shear-yielding stress are $10^{-1}$ to $10^3$ mPa·s (depending on the shear rate) and 10-100 Pa, respectively. To prepare the printable polyimine ink, the precursor monomers were partially cured by heating at 80° C. The solution viscosity increased as the polymerization proceeded. 10 wt % nano-clay (compared to the total solution weight) was added to introduce the shear-thinning effect and improve the capability of filaments to support themselves after deposition. The ink rheological properties were tested using the rheometer (TA Instruments, AR-G2, New Castle, DE, USA). As shown in the Supplementary Material (Figure S2), after being heated for 20 mins, the ink possessed a viscosity of ~$4.4 \times 10^3$ Pa·s at low shear rates ($1 \times 10^{-3}$ s$^{-1}$). Due to its strong shear thinning behavior, the ink exhibited an apparent viscosity of ~110 Pa·s at shear rates (~50 s$^{-1}$) typically experienced during printing. The shear storage modulus at the low-stress level and the shear yielding stress were ~10 kPa and ~200 Pa, respectively. Using the same pre-curing method, other commercial thermoset resins (e.g., epoxy, polyester) can also be adopted to print continuous-fiber composites using the designed printer head.

Figures 3A, 3B, 3C:
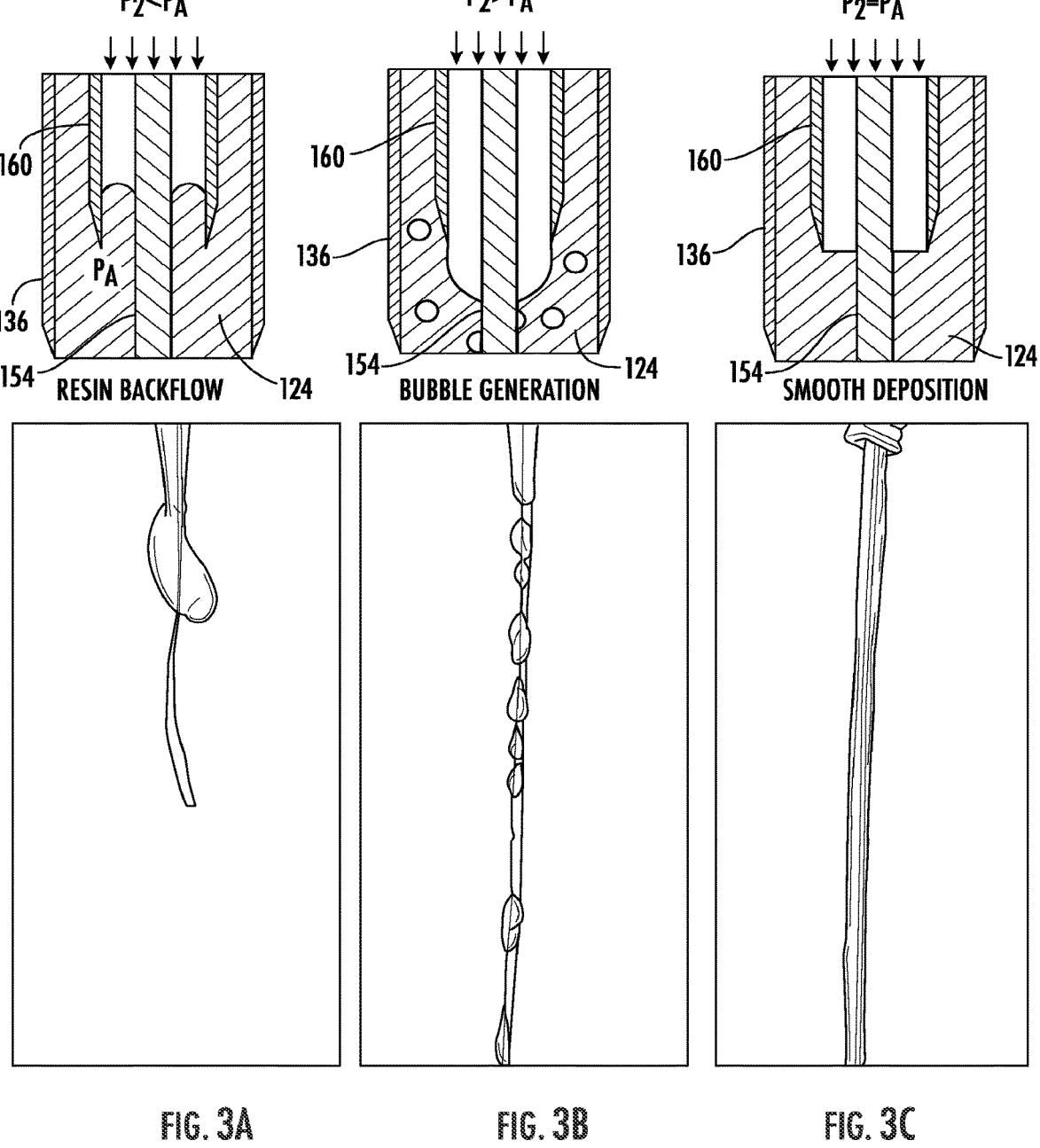
FIG. 3A shows a scenario in which the second pressure is less than the junction pressure, resulting in the backflow of the resin into the feeding tube.
FIG. 3B shows a scenario in which the second pressure is greater than the junction pressure, resulting in the generation of bubbles in the resin within the needle section.
FIG. 3C shows a scenario in which the second pressure is equal to the junction pressure, resulting in smooth deposition of the resin and the fiber.

Among the two pressures, $P_1$ controls the extrusion velocity, and $P_2$ determines the smooth deposition of the composite filament. As shown in FIG. 3A, when $P_2$ is lower than the pressure at the junction between the converging section and the needle section of the syringe ($P_A$), only the ink can be extruded while the fiber bundle is stable. A lower $P_2$ leads to the notable backflow of printable inks from the deposition syringe into the feeding tube, which resists the fiber movement. On the other hand, when $P_2$ is higher than the junction pressure $P_A$, as shown in FIG. 3B, the fiber bundle is seen to be extruded quickly, but bubbles are generated within the ink, which leads to the discontinuous cladding of the resin around the fiber. As shown in FIG. 3C, a smooth deposition (as shown in the Supplementary Video 1) can be realized by setting $P_2$ equal to the junction pressure $P_A$.

Because it is challenging to monitor the pressure distribution within the syringe during the filament extrusion, a fluid-mechanics model was established in Section S4 of the Supplementary Material to calculate the junction pressure $P_A$, and thus determine the magnitude of the secondary pressure ($P_2$) to be applied. Within the model, the syringe was split into three sections with a uniform inlet section followed by a converging section leading to another uniform needle section for filament extrusion. The model considers the flow rate of a fully developed non-Newtonian low-Reynold viscous liquid within the syringe and can predict the junction pressure based on the ink apparent viscosity and deposition pressure $P_1$. The calculated secondary pressure ($P_2$), which equals the junction pressure $P_A$, is plotted in Figure S4b as a function of input deposition pressure ($P_1$). The model serves as an effective computational tool to guide the printing process of composite samples and structures in the following sections. It also allows the future study to examine the influences of syringe geometry and other process parameters on the printing process.

Filament Extrusion Speed and Morphology

After extrusion, the continuous filaments were cut using a scissor and transferred to an oven for post-curing. Initially, a relatively low temperature (45° C.) was used to polymerize the matrix gradually and lock the printed shape with a sufficiently high modulus. After 2 h, the curing temperature was increased to 80° C. The polyimine matrix was fully polymerized after ~6 h.

Figures 4A, 4B, 4C, 4D:
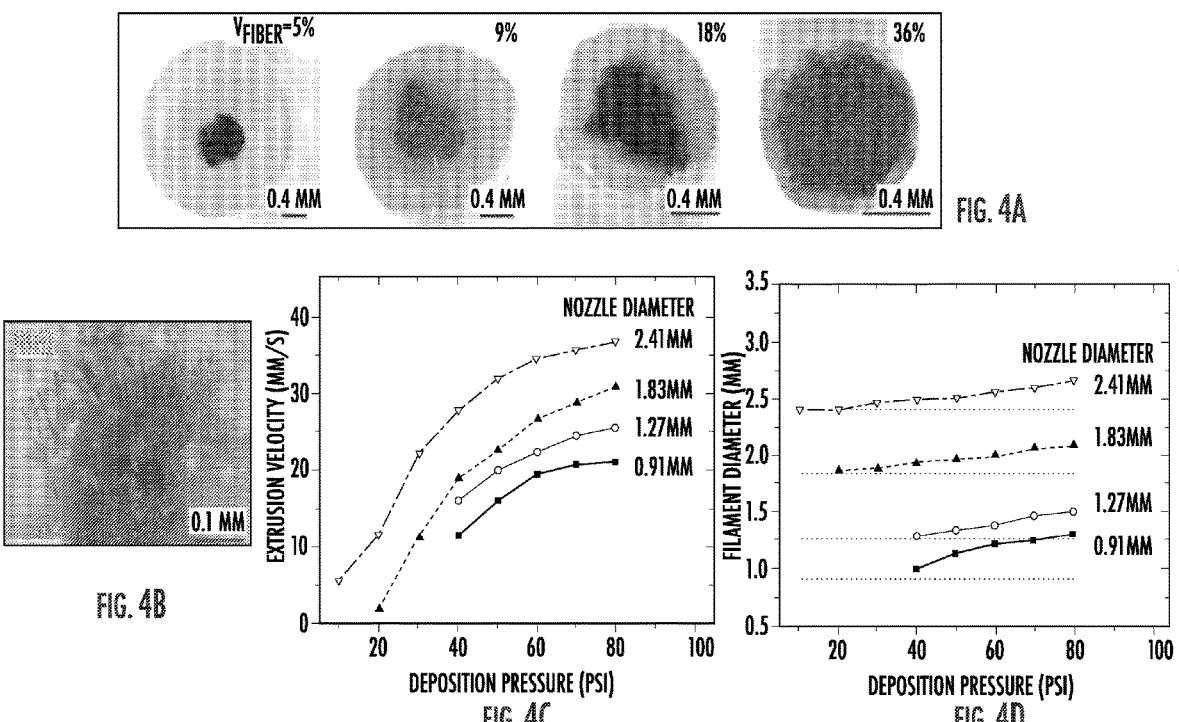
FIG. 4A shows cross-sectional views of composite filaments with different fiber contents.
FIG. 4B shows a cross-sectional view of the microscopic morphology of the fiber bundle of an example composite filament.
FIG. 4C is a graph of extrusion velocity as a function of deposition pressure, showing extrusion velocities for different deposition pressures and needle diameters.
FIG. 4D is a graph of filament diameter as a function of deposition pressure, showing filament diameters for different deposition pressures and needle diameters.

Cross-sectional views of fully-cured composite filaments were acquired using a microscope (Keyence VHX-7000, Itasca, IL). Because the deposition of composite filaments is driven by the shear stress applied on the fiber bundle, they can be printed with a circular cross-section, with the fiber bundle located in the filament center, as shown in FIG. 4A. The fiber content can be calculated based on the cross-sectional areas of the composite filament and carbon fibers. It can be tailored by changing the size of the dispenser needle. Four types of needles with inner diameters of 2.41 mm, 1.83 mm, 1.27 mm, and 0.91 mm were used, and the corresponding fiber volume fractions were 8%, 15%, 30%, and 59%, respectively, when the deposition pressure was 40 psi. The newly designed printer head was able to print filaments with fiber content up to 36%. FIG. 4B shows the morphology of the fiber in the filament cross-section. It is observed that the resin fully permeates inside the fiber bundle. The good impregnation of fiber will enable the fabrication of high-quality composites without voids and promote the bonding strength between fiber bundle and matrix, leading to their efficient load transfer.

The filament extrusion velocity was tested with different deposition pressures, $P_1$, and needle diameters, as shown in FIG. 4C. During the testing, the filament extrusion process was recorded by a video camera to measure the velocity. The pressure, $P_2$, was calculated using the fluid-mechanics model presented in the Supplementary Material. It was observed that the extrusion velocity increased with both pressure and needle size. For each needle diameter, the velocity can be tailored from around one millimeter per second up to a few centimeters per second, and such control was shown to be stable and repeatable. FIG. 4D shows the diameter of extruded filaments with different deposition pressures and needle diameters. After the printable ink exited the needle, it tended to swell because the hydrostatic pressure dropped to zero, which is commonly known as the die swelling effect. Because of this, the diameter of composite filaments increased as getting out of the needle tip. The increment was higher when a smaller diameter or higher deposition pressure was used. For example, the filament diameter was measured to be 1.29 mm when the needle diameter was 0.91 mm and the deposition pressure was 80 psi. This corresponds to a ~42% diameter increment, while the increment was only ~12% when the needle diameter is 2.41 mm.

The filament extrusion was driven by the shear force applied by the ink on the fiber bundle. In the Supplementary Material (Section S5), the shear force on the fiber bundle was calculated based on the measured extrusion velocity of filaments. As shown in Figure S6, the shear force increases with the deposition pressure and extrusion velocity. A smaller needle diameter typically leads to a higher shear force. For the 0.91 mm needle diameter, the highest shear force was ~0.034 N. During the filament extrusion, there exists friction between the fiber bundle and feeding tube, as well as rotational friction from the fiber bobbin. To optimize the design of the deposition syringe, the frictions on the fiber bundle should be minimized, and the driving shear force on the fiber bundle should overcome these frictions to ensure a steady-state filament extrusion.

Mechanical Properties of the Printed Thermally-Curable Composites

To evaluate the mechanical properties of the printed thermoset composites, a laminate sample was printed with three layers, and the fiber bundles were aligned in the same direction in each layer. During the printing, the deposition pressure was 40 psi, and the needle diameter was 1.83 mm. To enable smooth filament deposition, the traveling speed of the deposition head was set to be the same as the filament extrusion speed (as shown in Supplementary Video 2). The fiber volume content of the composite filaments was ~9%. The deposition spacing between the filaments was set to be 1.1 mm, which was ~87% of the filament diameter. After printing, the sample was transferred to a heating oven for post-curing. The printed laminate and the cross-sectional view are respectively shown in FIG. 5A and FIG. 5B. There were no defects on the surface of the printed samples after post-curing. The fiber bundles were observed to align well with each other, indicating good deposition precision. As a control sample, a composite laminate was fabricated using the direct molding process with the same fiber content and orientation.

Figures 5A, 5B, 5C, 5D:
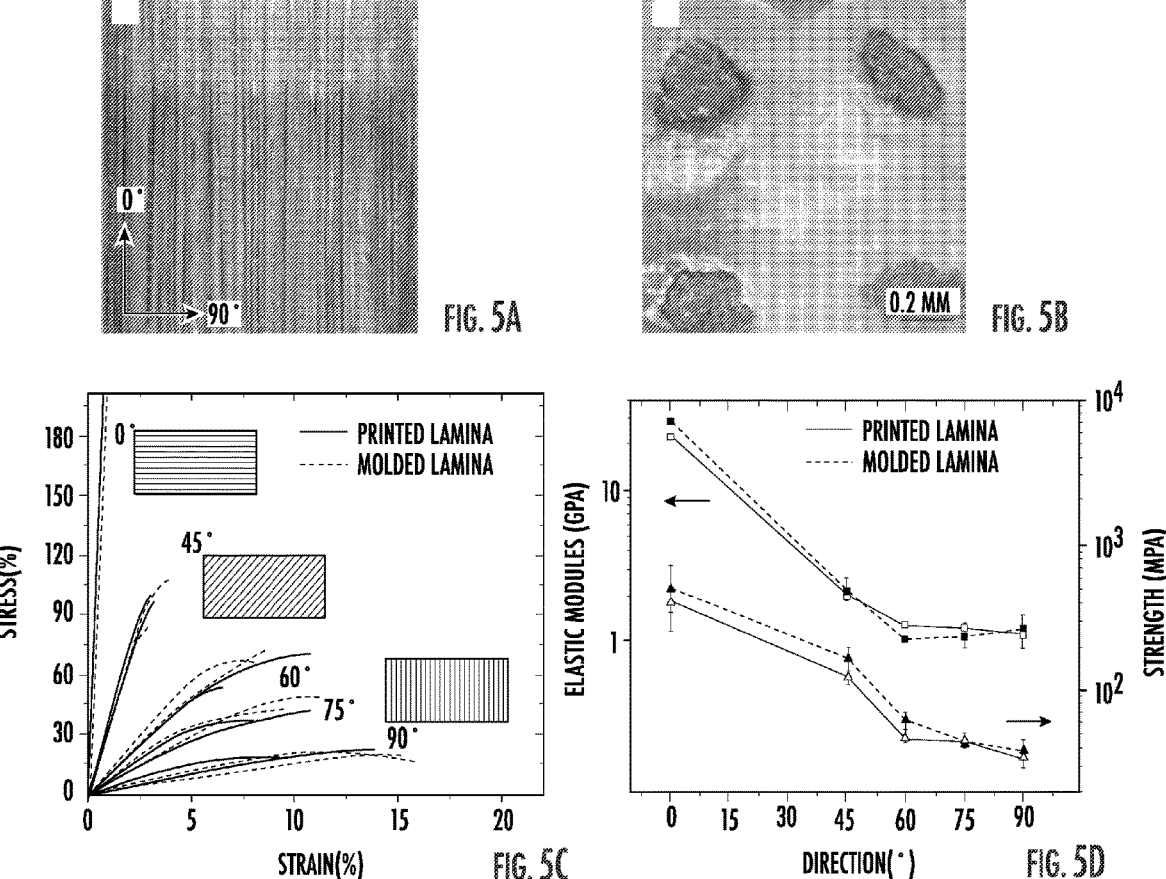
FIG. 5A shows a plan view of an example tensile specimen to be cut in different directions with respect to the fiber.
FIG. 5B shows a cross-sectional view of an example printed composite laminate.
FIG. 5C is a graph of stress as a function of strain, showing stress-strain curves for example tensile specimens cut in different directions with respect to the fiber.
FIG. 5D is a graph of elastic modulus and ultimate strength as a function of cut direction, showing elastic modulus and ultimate strength of example tensile specimens cut in different directions with respect to the fiber as compared to directly molded specimens.

Tensile specimens were cut in different directions (0°, 45°, 60°, 75°, and 90°) with respect to the fiber orientation. The specimens were manually cut using a razor into identical dimensions (width=20 mm and thickness=45 mm), the sample thickness being roughly three times of the filament diameter, which depends on the fiber content. After cutting, the specimens were carefully polished using sandpaper to maintain a rectangular geometry. The inset pictures of FIG. 5C show the appearances of the prepared specimen. The specimen was then subject to the uniaxial tension tests on Bose electro-force test instruments (3200 series II, New Eden Prairie, MN, USA). The glass transition behavior of the polyimine matrix was tested, and the results are shown in Figure S3 (Supplementary Material, Section S3). The glass transition temperature ($T_g$) of the polyimine matrix was around 55° C., which indicates that the composites are in the glass state at room temperature without viscoelastic effects. All the tension tests were performed at room temperature, and the strain rate was 2%/min in all cases.

FIG. 5C shows the stress-strain relations of the printed and directly-molded laminate in different directions of carbon fiber. Their elastic moduli (within the first 2% of strain) and ultimate strength are summarized in FIG. 5D. It is prominent to observe that the printed laminates exhibit comparable mechanical properties as the directly-molded samples in all directions, especially when the loading direction is vertical the fiber, and the filament interfaces are being stretched. This is mainly attributed to two mechanisms during the post-curing of printed composites. First, the interfacial polymerization among filaments leads to strong interfaces connected by covalent bonds, which are primarily the C=N bonds on the chain backbone. The interfacial covalent bonding prevents the laminate from breaking through filament delamination. Second, due to the slight viscous flow of thermoset resin during the post-curing, the composite filaments can be fully fused together with their interfaces disappeared. No defect or noticeable void was observed within the structure (FIG. 5B). It is important to note that the microscopic viscous flow of thermoset resin did not result in a noticeable macroscopic shape change of the composite dimension. The excellent mechanical performance of the printed composites represents a sustainable improvement compared to the previously printed thermoplastics and photo-curable thermoset composites, in which the filament interfaces were connected mainly by the weak non-covalent bonds (e.g., van der Waals force) (see I. Gibson, et al.), and noticeable void formation was observed within the composite structures (see M. Namiki, et al.; F. V. D. Klift, et al.; T. H. J. Vaneker, et al.).

The mechanical performance of printed composites with different fiber contents was examined. In the Supplementary Material (Section S6), Figure S7a shows the elastic modulus and ultimate strength of printed composites with 36% carbon fiber. They were measured in different directions with respect to fiber orientation. It was seen that the printed composites also exhibited comparable mechanical properties to the directly-molded samples in all directions.

Figures 6A, 6B, 6C:
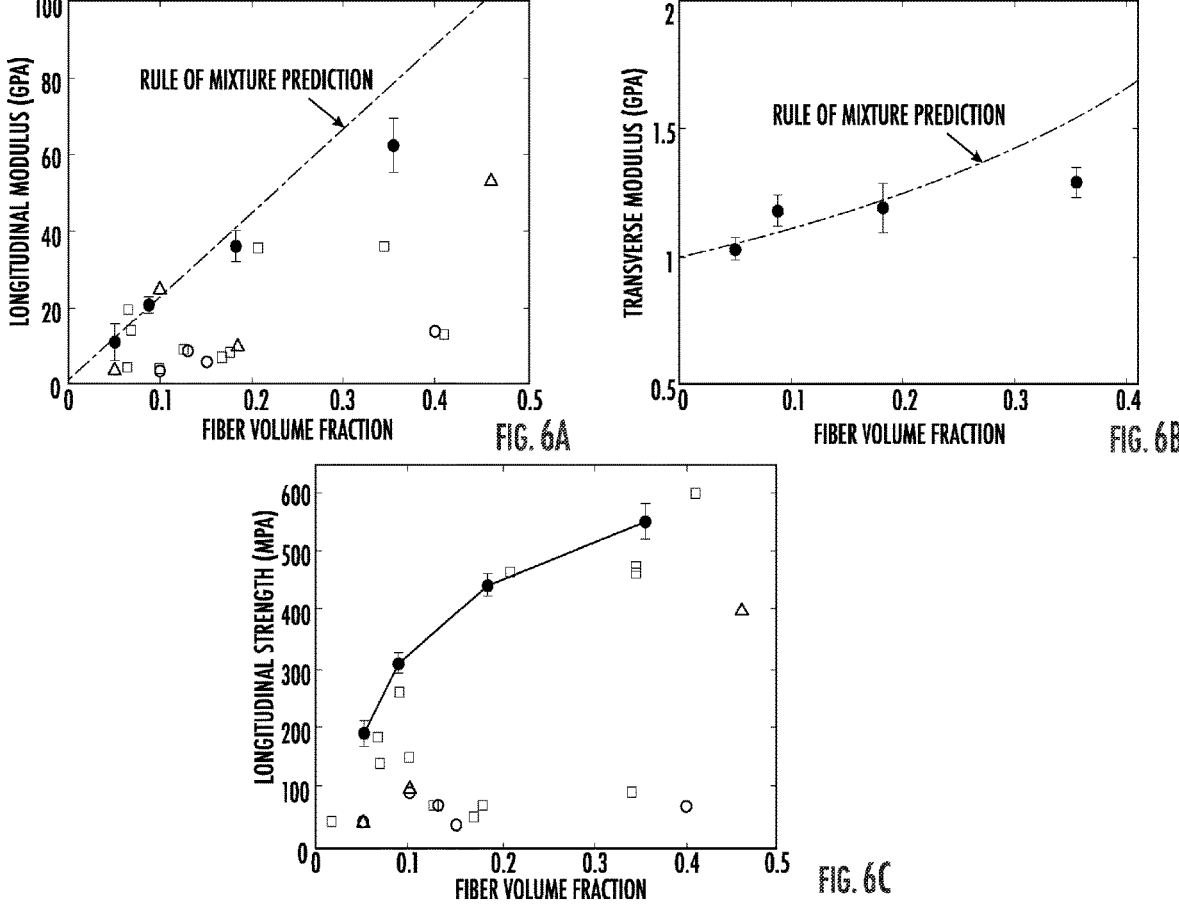
FIG. 6A is a graph of longitudinal modulus as a function of fiber volume fraction.
FIG. 6B is a graph of transverse modulus as a function of fiber volume fraction.
FIG. 6C is a graph of longitudinal strength as a function of fiber volume fraction.

The longitudinal modulus (along the fiber direction) and transverse modulus (vertical to the fiber) of the printed composites are summarized in FIG. 6A and FIG. 6B. The experimental data are plotted as solid circular dots. The modulus was shown to be substantially enhanced with the increment of fiber content. Specifically, the modulus was predicted by the Rule of Mixture, where the fiber modulus is taken to be 220 GPa. According to the DMA results in Figure S3 (Supplementary Material, Section S3), the matrix modulus at room temperature was 0.96 GPa. The comparison of FIG. 6A and FIG. 6B shows the experimental results agree with the predictions well, despite that the modulus of printed composites with 36% fiber is slightly lower than the theoretical predictions.

The longitudinal modulus in FIG. 6A is also compared with results in existing studies on composites 3D printing, which include the continuous carbon fiber-reinforced thermoplastic composites printed with fused deposition modeling (FDM) (blue squared dots) (see R. Matsuzaki, et al.; F. V. Der Klift, et al., 3D printing of continuous carbon fibre reinforced thermoplastic (CFRTP) tensile test specimens, Open J. Compos. Mater. 06 (01) (2016) 18-27; K.-i Mori, et al., Dieless forming of carbon fibre reinforced plastic parts using 3D printer, Procedia Eng. 81 (2014) 1595-1600; N. Li, et al., Rapid prototyping of continuous carbon fiber reinforced polylactic acid composites by 3D printing, J. Mater. Process. Technol. 238 (2016) 218-225; C. Yang, et al., 3D printing for continuous fiber reinforced thermoplastic composites: mechanism and performance, Rapid Prototyp. J. 23 (2017) 209-215; X. Tian, et al., Interface and performance of 3D printed continuous carbon fiber reinforced PLA composites, Compos. Part A Appl. Sci. Manuf. 88 (2016) 198-205; X. Tian, et al., Recycling and remanufacturing of 3D printed continuous carbon fiber reinforced PLA composites, J. Clean. Prod. 142 (2017) 1609-1618; G. D. Goh, et al., Characterization of mechanical properties and fracture mode of additively manufactured carbon fiber and glass fiber reinforced thermoplastics, Mater. Des. 137 (2018) 79-89; D. Jiang, et al., Mechanical behavior of carbon fiber composites produced with fused filament fabrication, in Solid Freeform Fabrication Symposium Proceedings, (2016)), short carbon fiber-reinforced thermoplastic composites printed with FDM (red circular dots) (see L. J. Love, et al., The importance of carbon fiber to polymer additive manufacturing, J. Mater. Res. 29 (17) (2014) 1893-1898; H. L. Tekinalp, et al., Highly oriented carbon-fiber polymer

*composites via additive manufacturing,* Compos. Sci. Technol. 105 (2014) 144-150; G. Liao, et al., *Properties of oriented carbon fiber/polyamide* 12 *composite parts fabricated by fused deposition modeling,* Mater. Des. 139 (2018) 283-292; W. Zhang, et al., *Interfacial bonding strength of short carbon fiber/acrylonitrile-butadiene-styrene composites fabricated by fused deposition modeling,* Compos. Part B Eng. 137 (2018) 51-59), and short carbon fiber-reinforced thermoset composites printed with direct ink writing (DIW) (green triangular dots) (see N. Nawafleh, et al, *Additive manufacturing of short fiber reinforced thermoset composites with unprecedented mechanical performance,* Addit. Manuf. 33 (2020), 101109; M. Invernizzi, et al, *UV-assisted* 3D *printing of glass and carbon fiber-reinforced dual-cure polymer composites,* Materials 9 (7) (2016) 583; B. G. Compton, et al, 3D-*printing of lightweight cellular composites,* Adv. Mater. 26 (34) (2014) 5930-5935). FIG. 6C shows the longitudinal strength of the printed composites and comparison to existing studies. The printed composites in this study used the tough thermoset matrix and continuous carbon fiber as the reinforcement. There was no notable void among the filaments, and they were connected by substantial covalent bonding. Therefore, the printed composites exhibited higher modulus and ultimate strength at an equivalent fiber content compared to existing studies.

The highest fiber content in FIG. 6 was 36%. In the Supplementary Material (Section S6), a composite lamina with ~43% fiber was printed by using a smaller nozzle with a 0.83 mm diameter. While the developed method can enable the steady extrusion of the filament, the printed composites exhibited weak mechanical performance compared to the directly molded sample with the same fiber content, especially the transverse strength. The reason might be that there was not enough resin on the surface of the filaments to enable their tight and covalent bonding. Determining how to further increase the fiber content while maintaining the mechanical performance of the printed composites is an aspect of future study.

3D Printing of Thermally-Curable Composite Structures

Figures 7A, 7B:
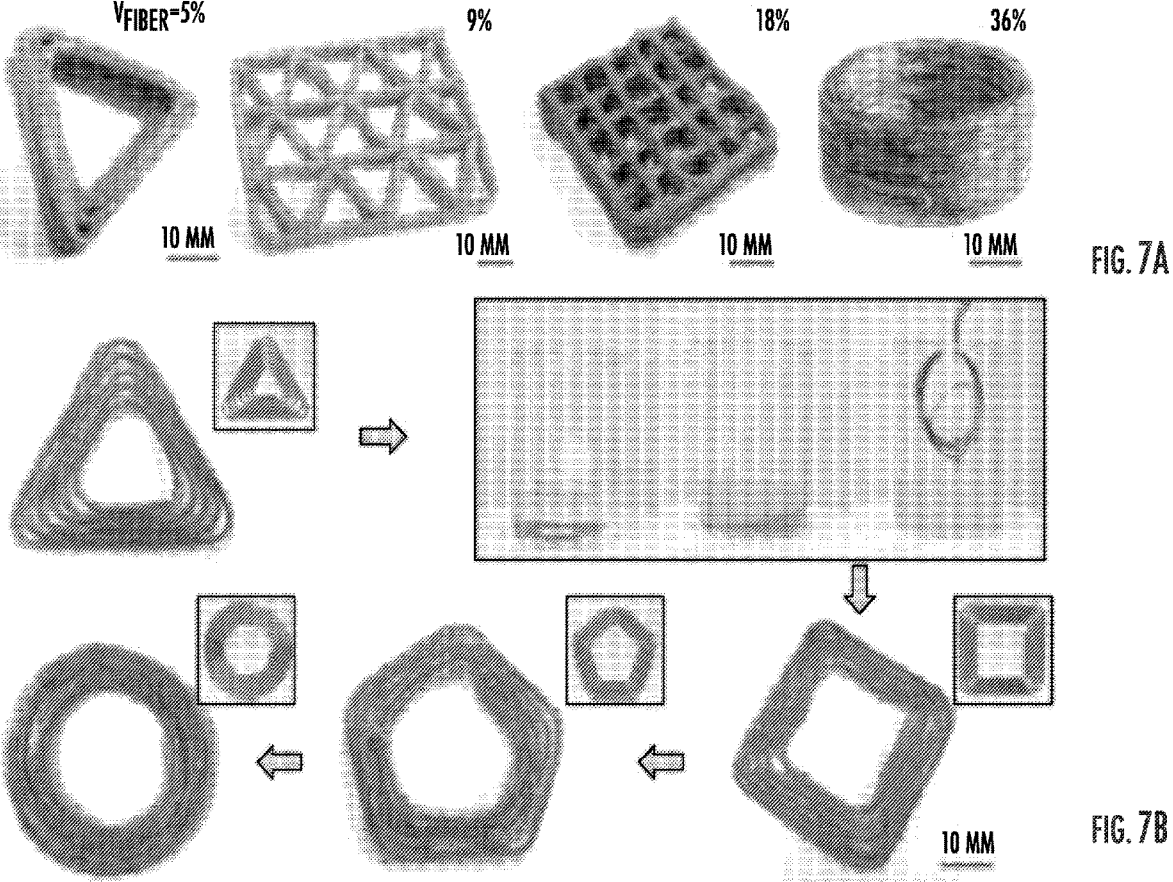
FIG. 7A includes perspective views of example printed composite structures each printed with a distinguished nozzle diameter and fiber volume content.
FIG. 7B illustrates recyclable 3D printing of fiber composites using an organic solvent, in which the printed structures are immersed in the amine-containing solvent at 80° C. for 10 min, the polyimine matrix is fully decomposed and clean fibers are reclaimed, and the decomposed polymer solution and fiber are loaded to the printer for the next round of 3D printing.

Several composite architectures with varied geometries were printed, as shown in FIG. 7A (see Supplementary Video 3 for the printing of the first architecture). Each structure has a unique fiber content by changing the nozzle diameter. The deposition pressure was set to 40 psi for all cases. After printing, all the structures were subjected to post-curing under the same temperature conditions. The structure geometry and dimensions were perfectly maintained after post-curing without collapse or notable shape distortion.

Using smaller nozzles would further promote the printing resolution of the composite structures. Another unique consideration for the DIW printing of continuous-fiber composites is the intrinsic stiffness of the fiber bundle. Thin filaments with higher fiber content tend to bounce off from the printing pathway at the turning location, which would notably affect the printing resolution, especially at the joints of complex structures. Therefore, the DIW printing of continuous fiber-reinforced thermoset composites requires careful path planning to consider the influences of fiber stiffness. To examine the maximum printing curvature with different fiber content, composite filaments with 180° turning features were printed (Figure S8, Supplementary Material). It was seen that the thick filaments maintain the printing curvature as more resin holds the fiber in position. The maximum printing curvatures for the three higher fiber contents (9%, 18%, and 36%) were estimated to be 0.12, 0.48, and 1.7 $mm^{-1}$, respectively. When the composite components in FIG. 7A were printed with different fiber contents, the printing path was designed with the highest curvatures below the corresponding critical values. Therefore, the printed pattern can exactly match the CAD model without notable shape distortions. The detailed relationship between maximum printable curvature, ink rheological properties, and fiber content will be an aspect for further study and incorporated into the existing path planning algorithm. For example, when the planned printing curvature is above the maximum value, an automatic scissor below the deposition needle may be triggered to cut the composite filaments.

To examine the repeatability of the developed printing method, multiple composite components were printed using the same batch bath of ink, the same fiber bundle, and identical deposition pressures. Conventional thermosets exhibit permanent crosslinking networks and thus cannot be recycled. But in this study, the adopted polyimine network contains imine bonds on the chain backbone (see P. Taynton, et al. (2014); P. Taynton, et al., *Repairable woven carbon fiber composites with full recyclability enabled by malleable polyimine networks,* Adv. Mater. 28 (15) (2016) 2904-2909), and was shown to be effectively depolymerized into precursor monomers in amine-containing solutions (see X. He, et al.; P. Taynton, et al. (2016)). Because the imine linkage formation is reversible, re-polymerization can occur via heating the polymer solution in an open environment to remove the small molecule byproduct.

The recycling mechanism was utilized during the repeat printing of composite components. As shown in FIG. 7B, a triangular composite component with 9% fiber content was first printed with $P_1$=40 psi and $P_2$=11 psi. After the composite was fully cured, it was immersed in the propylamine solvent at 80° C. to decompose the matrix and reclaim the fiber bundle. Note that the primary recycling of the thermoset matrix is due to the reversible bond exchange reactions between the network and the solvent molecule, as reported in previous work (see P. Taynton, et al. (2014); X. He, et al.). The decomposed polymer solution was partially cured at 80° C. for 10 mins and reloaded into the printer head with the reclaimed fiber bundle for the next round of printing. Such process was repeated three times to print composite components in different geometries. Note that under the same processing conditions in each cycle, the ink exhibited identical rheological properties. During the printing, identical deposition pressure ($P_1$ and $P_2$) and needle diameter were used. The composite components were precisely printed without cracking or shape distortion. No printing adjustment or supplementary material was added during the printing process. Therefore, the newly designed printing method shows great repeatability and reliability in the printing of thermoset composites.

3D Printing of UV-Curable Thermosets and Composites

To demonstrate its versatility, the developed printing method was further applied to print UV-curable thermosets and their composites. An acrylate-based thermoset was adopted with a detailed formulation described in the experimental section. During the printing, two UV lamp chips (Shenzhen YM Technology Co., Ltd, China) were attached on each side with a ~15 cm distance to the needle tip. Each chip had 100 LED beads, and the power output was 20 W. With the applied UV intensity, the matrix can be quickly cured within seconds. As shown in the Supplementary Material (Section S8), the room temperature modulus of the matrix was increased to 500 MPa within 1 s, which helped the filament hold the position in place. To further enhance the shape-fixing ability of the filament, a portable dental UV curing lamp (Foshan Horyn Medical Instrument Co., Ltd. China) with 2 W power output was applied close to the filament during the printing.

Uniaxial tension tests were performed on the printed UV-curable composites with 9% carbon fiber, and the results are shown in the Supplementary Material (Section S8). As shown in Figure S11, the acrylate composites exhibited comparable modulus and longitudinal strength compared to the printed thermally-curable polyimine composites with the same fiber content. However, because the filaments were mainly connected via non-covalent bonding, the transverse strength (~19 MPa) was notably lower than that of the polyimine composites (~33 MPa).

Figures 8A, 8B, 8C:
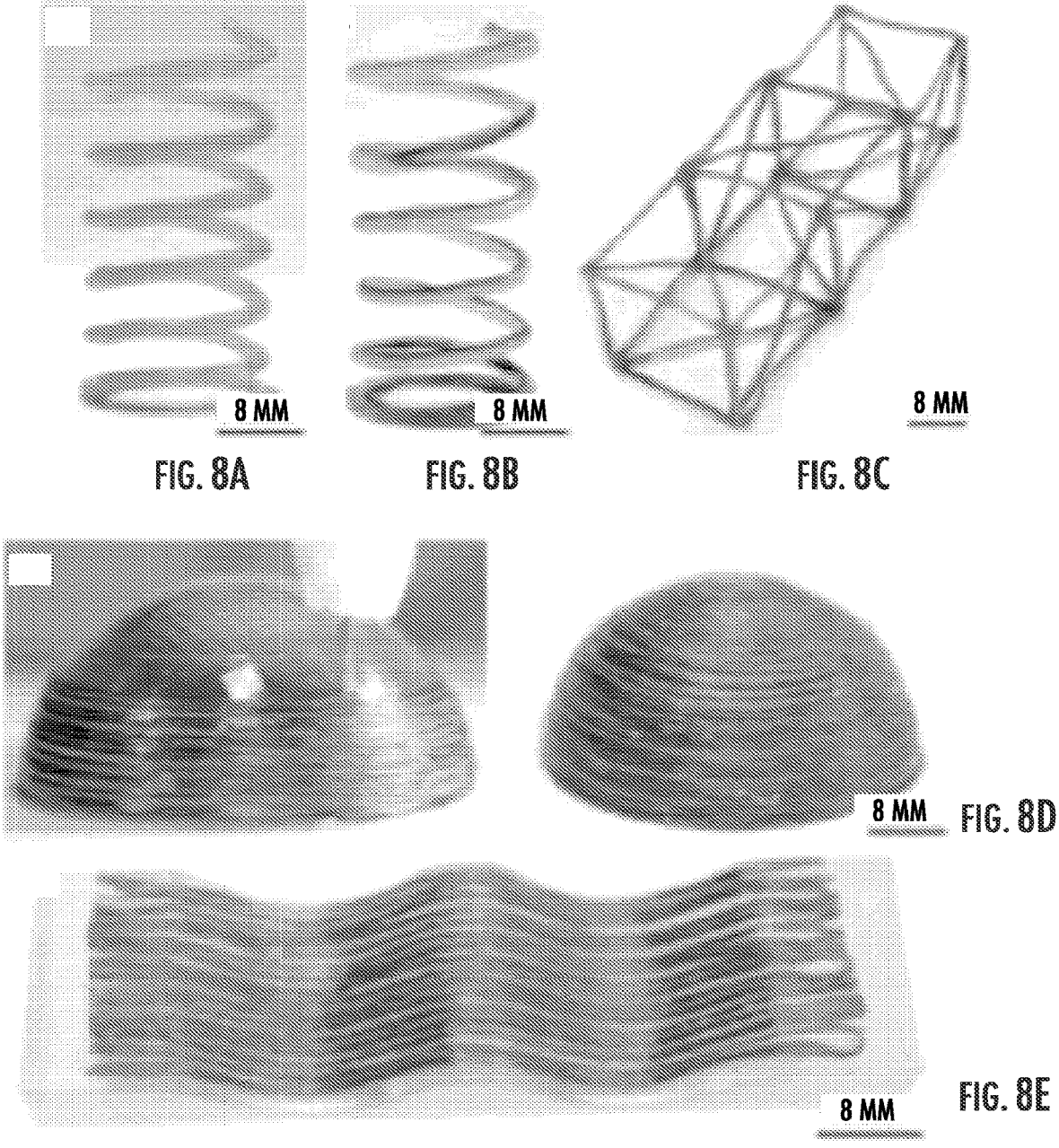
FIG. 8A shows a perspective view of an example 3D printed spring using a UV-curable thermoset without a carbon fiber.
FIG. 8B shows a perspective view of an example 3D printed spring using a UV-curable thermoset with a carbon fiber.
FIG. 8C shows a perspective view of a lattice structure with carbon fiber forming associated rods printed at the design position as set forth in this disclosure.

Because the filament can be quickly solidified, and there was no external force applied on the filament after extrusion, free-standing 3D printing of thermoset components can be realized. As shown in FIG. 8A and FIG. 8B, an acrylate spring without and with carbon fiber bundle (volume fraction=5%) can be both printed without supporting materials (Supplementary Video 4). FIG. 8C demonstrates that a lattice structure with 9% carbon fiber can be created, wherein each rod is printed at the designed positions and then manually cut after being welded at the joint.

Modern composite products demand laying fiber on a 3D surface, which would enhance the mechanical properties of objects, or introduce electrical and thermal functions. By properly designing the printing pathway, the developed printing method was able to deposit the fiber composites on curved surfaces, including a wavy and spherical surface, as shown in FIG. 8D and FIG. 8E (Supplementary Video 5). Specifically, the coating on the spherical surface was realized by depositing a single composite filament along a spiral pathway. The fibers were evenly distributed. Overall, 3D printing of UV-curable composites using the developed printing method enables the placement of reinforcement fibers in the 3D space with or without substrate support, thus overcoming the manufacturing limitations in the conventional approaches. The printing method shows great potential to open new avenues for composite design and dramatically expedite the development of new composite products.

3D Printing Using a Two-Stage UV-Curable Resin

Figures 9A, 9B, 9C, 9D, 9E:
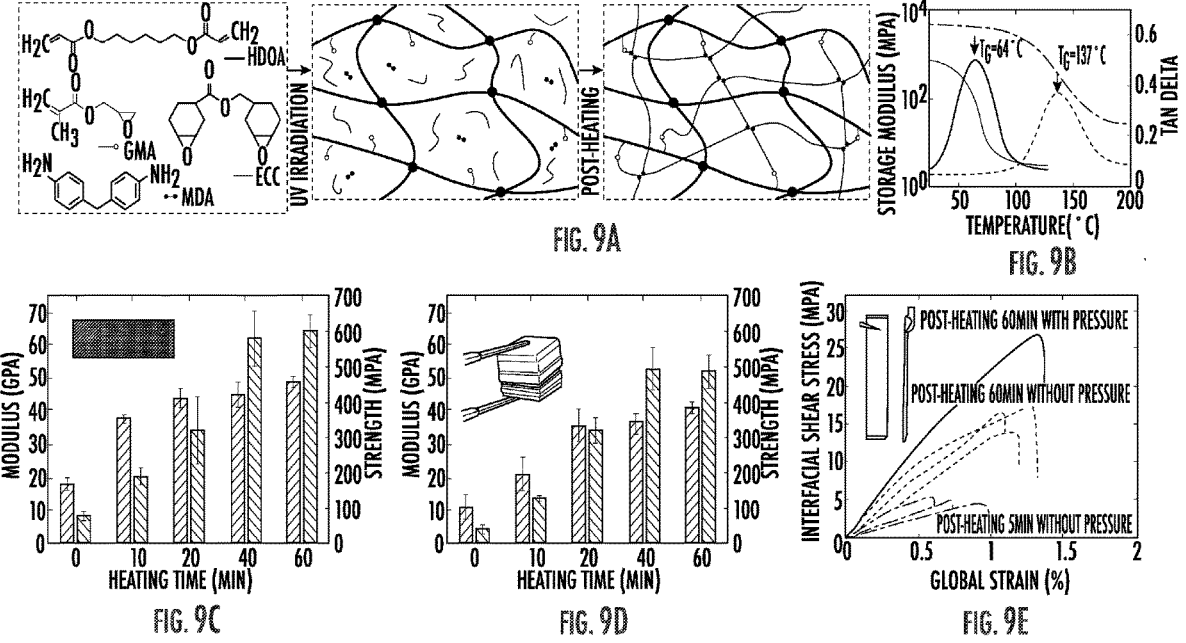
FIG. 9A shows monomers and catalysts for the two-stage UV-curable resin, as well as illustrations of the network structure evolution during curing, with an interpenetrating network being newly formed after post-curing.
FIG. 9B shows the storage modulus and tan delta of the cured resin after post-curing.
FIG. 9C shows tensile elastic modulus and ultimate strength of printed composite laminates as a function of post-heating time.
FIG. 9D shows compression elastic modulus and ultimate strength of printed composite laminates as a function of post-heating time.
FIG. 9E shows interfacial shear stresses plotted as a function of global engineering strain.

In some embodiments, the developed printing method may use a two-stage UV-curable resin as the printable ink to dramatically promote the mechanical strength of 3D printed composites. As shown in FIG. 9A, a two-stage UV-curable resin typically contains acrylate groups, so it can be cured into a loosely crosslinked network upon UV irradiation. Afterward, the materials may be subjected to post-heating, wherein the covalent bonding among reactive groups forms a second interpenetrating network, as shown. A wide variety of two-stage UV-curable resins can be adopted for the developed printing method. In recent work, an acrylate/epoxy two-stage UV-curable resin was used. The resin contained acrylate, amine, and epoxy as major constituents. Upon UV irradiation, the free-radical polymerization among acrylate groups formed a loosely crosslinked network. During the post-heating, the reactions between the epoxy and diamine groups formed a second interpenetrating network, which substantially increases the network crosslinking density and mechanical properties. FIG. 9B illustrates the thermal-mechanical properties of printed thermosets before and after post-heating, showing that the transition temperature increased from 64° C. to 137° C. The rubbery modulus (the modulus at the highest testing temperature) increased from 1.3 MPa to 25.8 MPa. FIG. 9C shows the tensile modulus (within 0.25% strain) and strength of printed 0°/90° symmetric laminates with 53% carbon fiber. Compared to that before post-heating, the modulus was increased by 2.7 times (from 18 GPa to 49 GPa), and the ultimate strength was increased by 7.4 times (from 81 MPa to 599 MPa). FIG. 9D shows the compression modulus and strength, which were respectively enhanced by 3.6 times (from 11.8 GPa to 41.9 GPa) and 11 times (from 41 MPa to 488 MPa) after 60 mins post-heating.

Another advantage of printing two-stage UV-curable resins is that such may dramatically promote the bonding strength among printing filaments and printing layers, as the covalent reactions during the post-heating may lead to chain connection on the interface. This may provide exciting opportunities to tackle ground challenges of weak bonding strength of 3D printed composites, as well as to offer new solutions for onsite composite repairing. In the present work, the interfacial bonding strength of two composite layers was examined using lap-shear tests. The composite lamina was printed on the surface of another piece of material. After post-heating, the samples were subjected to tension until interface debonding. The interfacial shear stress is plotted in FIG. 9E as a function of the strain. Compared to the shear strength with only 5 min post-heating heating, the shear strength after 60 min of heating increased by 5.1 times (4.5 MPa to 23 MPa). The ultimate shear strength was comparable to the bonding strength of epoxy adhesives.

Use of a Six-Axis Robotic Arm for Moving the Printer Head

Figures 10A, 10B, 10C, 10D, 10E:
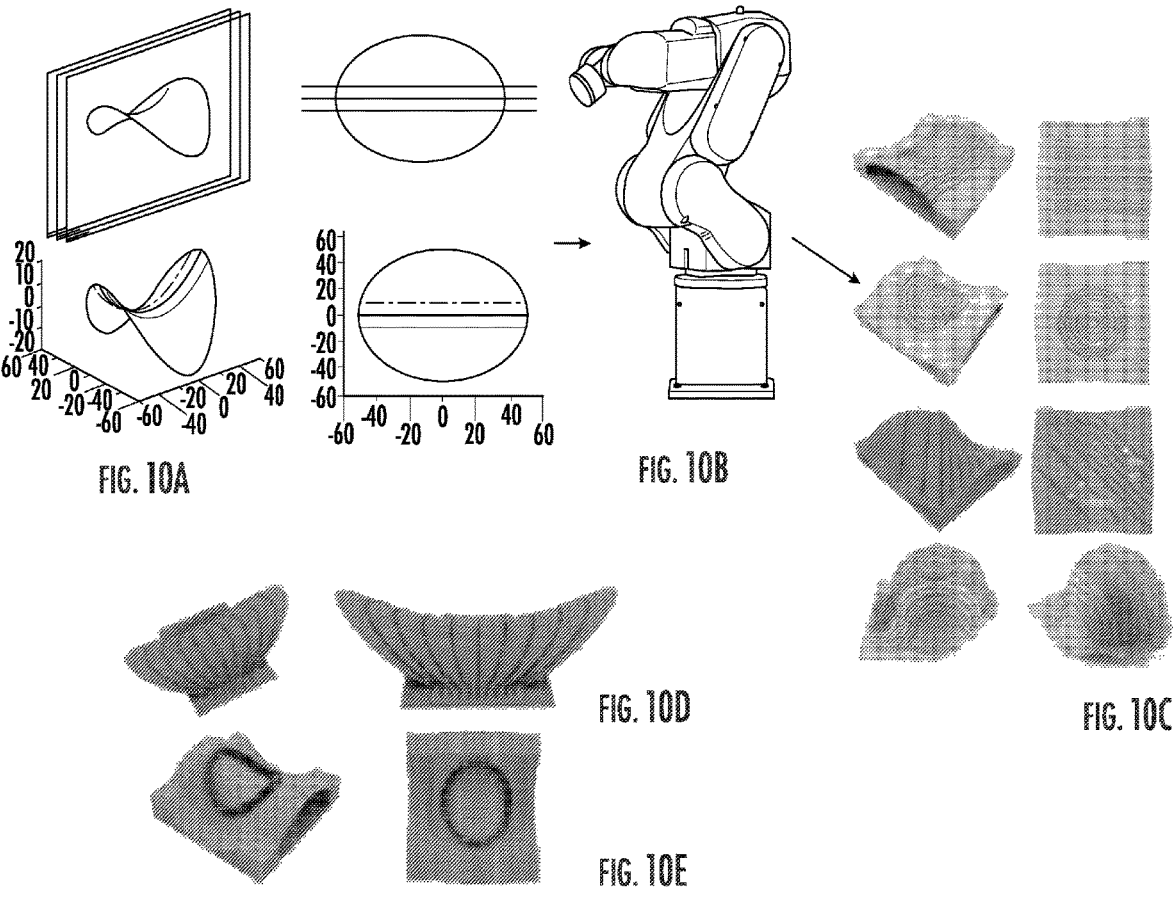
FIG. 10A shows an approach for determining the mathematical function of a printing pathway with controlled filament spacing.
FIG. 10B is a perspective view of the six-axis robotic arm.
FIG. 10C shows perspective views of example composite structures that were 3D printed on curved surfaces using the six-axis robotic arm, with the composite structures each containing 45% carbon fiber.
FIG. 10D shows perspective views of another example composite structure that was 3D printed on a curved surface using the six-axis robotic arm, with the composite structure containing 45% carbon fiber.
FIG. 10E shows perspective views of still another example composite structure that was 3D printed on a curved surface using the six-axis robotic arm, with the composite structure containing 45% carbon fiber.

In some embodiments, the developed printer head may be integrated with a six-axis robotic arm to enable the printing of fiber composites on 3D surfaces with a predefined printing pathway. As shown in FIG. 10A, a digital workflow may start with the g-code generation. The surfaces first were mathematically described in CAD software. Then, a specific cutting plane was defined, and the intersections with the surfaces were solved. Numerical iterations were then performed to adjust the position of these cutting planes, and the distance among the intersection curves on the target surfaces was checked in each step. This allows for the optimization of the geometry and position of the cutting plane to control the pattern of intersection curves, either in the zigzag or contour-parallel pattern. The distance between the fiber spacing can also be precisely controlled locally. The intersection curves were then translated into the g-code to control the motion of an Epson six-axis robotic arm, as shown in FIG. 10B, to lay composite filaments on the target surface.

The effectiveness of the algorithm was experimentally verified as shown in the experimental images of FIG. 10C and FIG. 10D. The figures show the composite laying on a 3D curved surface with a contour parallel pattern or a zigzag pattern. The printing process was smooth, without any nozzle clogging or filament distortion issues. The printed filaments were shown to follow the intended printing pathway in a high resolution. The ability to control the filament spacing locally also was demonstrated. As shown in FIG. 10C, the spacing on the 3D surface can be controlled as 18 mm and 6 mm, respectively, for example. FIG. 10E shows the printing of composites on a curved surface with multiple printing layers. The ability to control the local fiber content is desirable to tailor the fiber distribution and enable unpreceded mechanical performers of repaired composite structures.

Conclusion

In summary, the developed versatile design of printer head for the DIW 3D printing of continuous-fiber reinforced thermoset composites may be applicable to both thermally-curable and UV-curable resins. The extrusion of composite filament may be driven by the shear stress imposed on the fiber bundle during the viscous flow of printable inks. The extrusion velocity and fiber volume content can be precisely controlled by adjusting the material and printing parameters, such as ink rheological properties, syringe geometry, and deposition pressure. For the printing of thermally-curable composites, the elastic modulus and ultimate strength in all printing directions may be close to those of directly molded samples. This is because, during the post-curing of thermally-curable thermoset composites, the interfacial polymerization among the filaments leads to the strong interface connected by covalent bonds. In addition, the slight viscous flow can be leveraged to close the micro-voids among filaments and improve the mechanical performance of printed composites. The developed printing method also demonstrates excellent repeatability and reliability in different printing cycles. For the printing of UV-curable composites, the developed method realized the free-standing 3D printing without supporting materials, which enables the efficient deposition of reinforcement fibers in 3D space with or without a substrate. The developed printing method can be readily extended to other thermoset resins (e.g., epoxy) and high-strength reinforcement fibers (e.g., glass fiber). The developed printing method can be incorporated with a two-stage UV curable resin to dramatically enhance the mechanical strength and stiffness of printed composites, as well as to enhance their interfacial bonding strength. The printer head can be readily mounted onto a six-axis robotic arm to drive the printing on curved surfaces or in complicated geometry. The printing method represents a significant step forward for the advanced manufacturing of polymer composites and potentially disrupts the modern composite design, rapid prototyping, and product development.

Although specific embodiments of the disclosure have been described, one of ordinary skill in the art will recognize that numerous other modifications and alternative embodiments are within the scope of the disclosure. For example, while various illustrative implementations and structures have been described in accordance with embodiments of the disclosure, one of ordinary skill in the art will appreciate that numerous other modifications to the illustrative implementations and structures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments.

What is claimed is:

1. A printer head for three-dimensional printing of a continuous fiber-reinforced thermoset composite, the printer head comprising:

a deposition syringe defining a resin reservoir configured to contain a supply of a resin therein, an air chamber, and a first inlet port in fluid communication with the air chamber and configured to deliver a first flow of air thereto, the deposition syringe comprising:

a syringe body comprising an inlet section, a needle section defining an outlet, and a converging section disposed between the inlet section and the needle section; and a piston movably disposed within the syringe body;

a fiber housing defining a fiber chamber configured to contain a supply of a fiber therein, and a second inlet port in fluid communication with the fiber chamber and configured to deliver a second flow of air thereto; and a feeding tube extending from the fiber chamber to the needle section, the feeding tube configured to receive the second flow of air therein and to guide the fiber from the fiber chamber to the needle section, wherein the feeding tube extends through the air chamber and the resin reservoir and into the needle section.

2. The printer head of claim 1, wherein the resin reservoir is defined at least in part by the piston and the syringe body.

3. The printer head of claim 1, wherein the air chamber is defined at least in part by the piston and the syringe body.

4. The printer head of claim 1, wherein the first inlet port is configured to deliver the first flow of air into the air chamber at a first pressure for moving the piston relative to the syringe body to cause the resin and the fiber to be extruded from the nozzle section.

5. The printer head of claim 1, wherein the second inlet port is configured to deliver the second flow of air into the fiber chamber at a second pressure for inhibiting backflow of the resin into the feeding tube.

6. The printer head of claim 1, wherein the feeding tube extends coaxially with the syringe body.

7. The printer head of claim 1, further comprising:

a first tube coupled to the first inlet port and configured to deliver the first flow of air thereto; and a second tube coupled to the second inlet port and configured to deliver the second flow of air thereto.

8. The printer head of claim 1, further comprising:

the supply of the resin contained within the resin reservoir; and the supply of the fiber contained within the fiber chamber.

9. A printer system for three-dimensional printing of a continuous fiber-reinforced thermoset composite, the printer system comprising:

a motion stage or a robotic arm;

a printer head coupled to the motion stage or the robotic arm, the printer head comprising:

a deposition syringe defining a resin reservoir configured to contain a supply of a resin therein, an air chamber, and a first inlet port in fluid communication with the air chamber and configured to deliver a first flow of air thereto, the deposition syringe comprising:

a syringe body comprising an inlet section, a needle section defining an outlet, and a converging section disposed between the inlet section and the needle section; and a piston movably disposed within the syringe body;

a fiber housing defining a fiber chamber configured to contain a supply of a fiber therein, and a second inlet port in fluid communication with the fiber chamber and configured to deliver a second flow of air thereto; and a feeding tube extending from the fiber chamber to the needle section, the feeding tube configured to receive the second flow of air therein and to guide the fiber from the fiber chamber to the needle section; and a dispenser in fluid communication with the first inlet port and the second inlet port, the dispenser configured to control a first pressure of the first flow of air and a second pressure of the second flow of air.

\* \* \* \* \*